United States Patent
Yoon

(10) Patent No.: US 11,030,288 B2
(45) Date of Patent: Jun. 8, 2021

(54) ELECTRONIC DEVICE FOR AUTHENTICATING USING BIOMETRIC INFORMATION AND METHOD OF OPERATING ELECTRONIC DEVICE

(71) Applicant: Samsung Electronics Co., Ltd., Suwon-si (KR)

(72) Inventor: Sung-Jin Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 274 days.

(21) Appl. No.: 15/903,581

(22) Filed: Feb. 23, 2018

(65) Prior Publication Data
US 2018/0247039 A1 Aug. 30, 2018

(30) Foreign Application Priority Data
Feb. 27, 2017 (KR) .................. 10-2017-0025597

(51) Int. Cl.
*G06F 21/32* (2013.01)
*G06K 9/00* (2006.01)
(Continued)

(52) U.S. Cl.
CPC .............. *G06F 21/32* (2013.01); *G06F 21/84* (2013.01); *G06K 9/00597* (2013.01);
(Continued)

(58) Field of Classification Search
CPC .......... G06F 21/32; G06F 21/84; G06F 3/041; G06F 3/0487; G06F 3/04812;
(Continued)

(56) References Cited

U.S. PATENT DOCUMENTS 9,418,306 B2 8/2016 Bae et al.
2013/0038759 A1* 2/2013 Jo ...................... H04N 5/23293
348/240.99
(Continued)

FOREIGN PATENT DOCUMENTS

| KR | 10-2015-0107098 A | 9/2015 |
| KR | 10-2016-0048361 A | 5/2016 |
| WO | 2016/080716 A1 | 5/2016 |

OTHER PUBLICATIONS

European Office Action dated Oct. 11, 2019, issued in European Application No. 18 158 968.0.
(Continued)

*Primary Examiner* — Christopher C Harris
(74) *Attorney, Agent, or Firm* — Jefferson IP Law, LLP

(57) ABSTRACT

A device and a method for authenticating using biometric information in an electronic device are provided. The electronic device includes a display, and at least one processor. The at least one processor detects an execution of an application which provides an authentication service based on biometric information, changes at least one biometric information recognition related variable, in response to detecting the execution of the application, and controls to display an application execution screen including at least one authentication guide image corresponding to the at least one biometric information recognition related variable. Other embodiments may also be possible.

15 Claims, 37 Drawing Sheets

(51) Int. Cl.
  *H04W 12/08* (2021.01)
  *G06F 21/84* (2013.01)
  *H04W 12/065* (2021.01)
  *G06F 3/041* (2006.01)
  *H04W 12/65* (2021.01)
(52) U.S. Cl.
  CPC ...... *G06K 9/00912* (2013.01); *H04W 12/065* (2021.01); *H04W 12/08* (2013.01); *G06F 3/041* (2013.01); *H04W 12/65* (2021.01)
(58) Field of Classification Search
  CPC ....... G06F 9/453; H04W 12/06; H04W 12/08; H04W 12/00504; H04W 12/0605; G06K 9/00597; G06K 9/00912
  See application file for complete search history.

(56) References Cited

U.S. PATENT DOCUMENTS

| | | | | |
|---|---|---|---|---|
| 2013/0082945 | A1* | 4/2013 | Jo | G06F 3/04883 345/173 |
| 2015/0074615 | A1* | 3/2015 | Han | G06F 3/0481 715/863 |
| 2015/0091794 | A1* | 4/2015 | Ha | H04M 1/72522 345/156 |
| 2015/0131876 | A1 | 5/2015 | Chang | |
| 2015/0242696 | A1 | 8/2015 | Kim et al. | |
| 2015/0254508 | A1* | 9/2015 | Kimura | G06K 9/00604 382/117 |
| 2016/0092720 | A1* | 3/2016 | Lee | G06K 9/00604 348/78 |
| 2016/0350522 | A1 | 12/2016 | Chi et al. | |
| 2017/0169202 | A1* | 6/2017 | Duggan | G06F 21/32 |
| 2017/0337442 | A1 | 11/2017 | Um | |
| 2018/0060556 | A1* | 3/2018 | Fujino | G06K 9/00617 |

OTHER PUBLICATIONS

European Office Action dated Jun. 30, 2020, issued in European Patent Application No. 18 158 968.0.
Indian Office Action dated Sep. 19, 2020, issued in Indian Patent Application No. 201834007030.

* cited by examiner

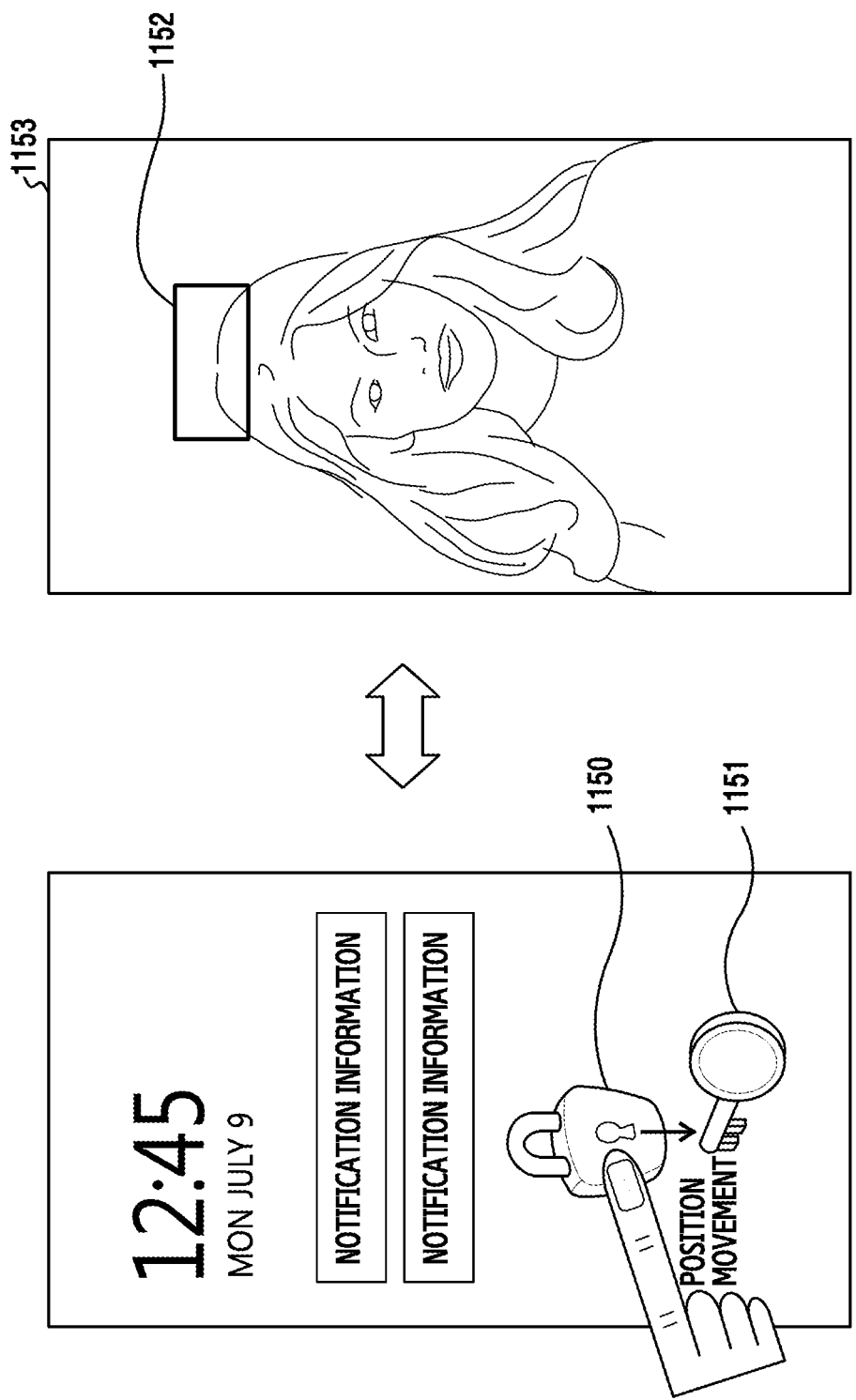

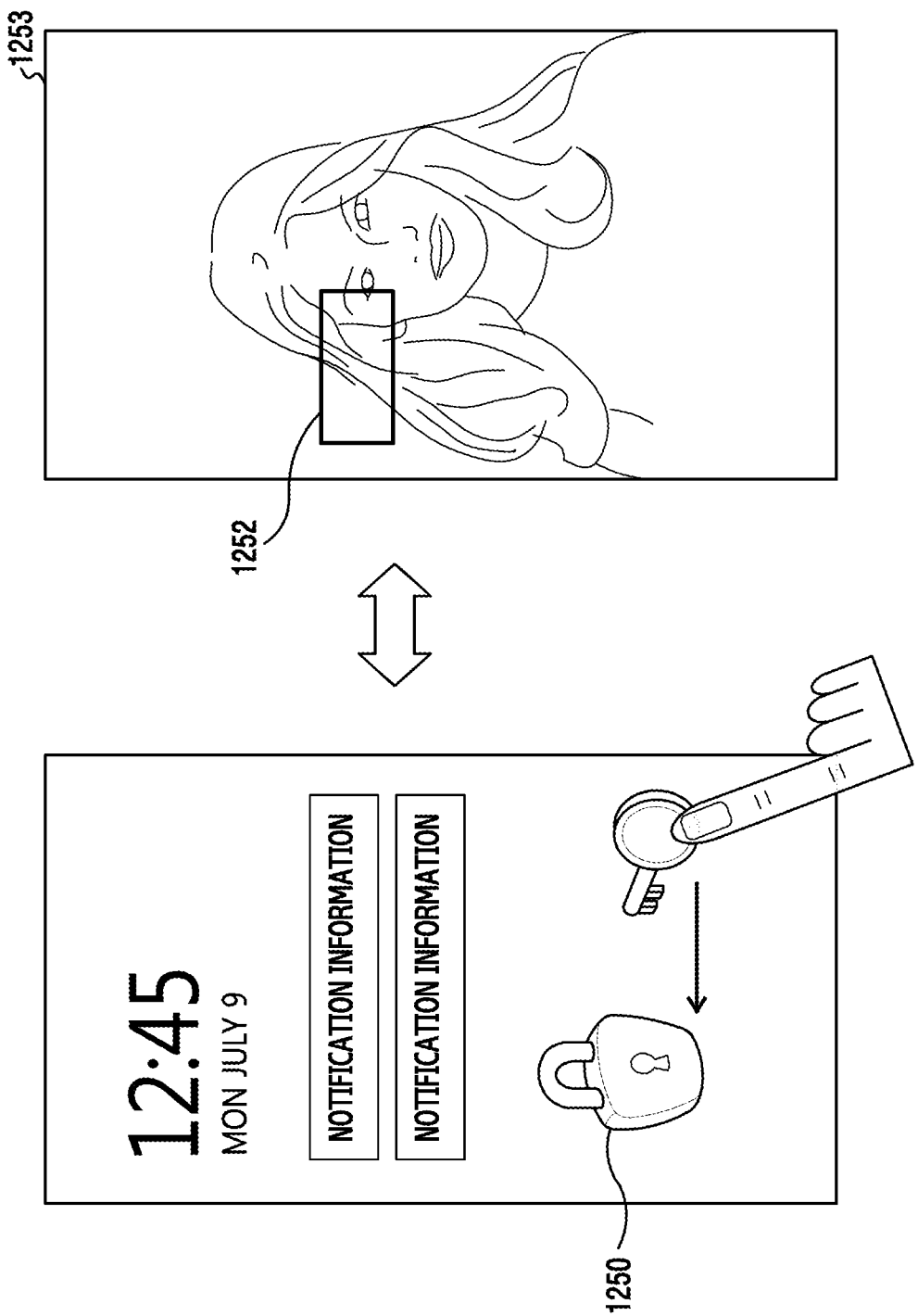

ELECTRONIC DEVICE FOR AUTHENTICATING USING BIOMETRIC INFORMATION AND METHOD OF OPERATING ELECTRONIC DEVICE

CROSS-REFERENCE TO RELATED APPLICATION(S)

This application is based on and claims priority under 35 U.S.C. § 119(a) of a Korean patent application number 10-2017-0025597, filed on Feb. 27, 2017 in the Korean Intellectual Property Office, the disclosure of which is incorporated by reference herein in its entirety.

BACKGROUND

Field

The disclosure relates to an electronic device for authenticating using biometric information, and a method of operating the electronic device.

Description of Related Art

Due to developments of information communication techniques and semiconductor techniques, an electronic device is able to perform complex functions. For example, the electronic device may provide various functions such as a mobile communication function, a data communication function, a data output function, a data storage function, an image capture function, a voice record function, and a payment function using personal information. Therefore, while importance for a protection of personal information stored in the electronic device is increased, a security service using a biometric recognition such as a face recognition, or an iris recognition is provided. For example, the electronic device provides a lock function for security, and releases the lock function to enable a user to use the electronic device by performing a user authentication by iris recognition.

The above information is presented as background information only to assist with an understanding of the disclosure. No determination has been made, and no assertion is made, as to whether any of the above might be applicable as prior art with regard to the disclosure.

SUMMARY

An electronic device displays a lock screen according to a user request, and in a case in which the user request is detected again, the electronic device releases a lock function by performing a user authentication by an iris recognition. In this case, the user suffers inconvenience due to a plurality of user inputs to release the lock function.

Aspects of the disclosure are to address at least the above-mentioned problems and/or disadvantages and to provide at least the advantages described below. Accordingly, an aspect of the disclosure is to provide a device and a method for performing a user authentication using biometric information without a plurality of user inputs in an electronic device.

In accordance with an aspect of the disclosure, an electronic device is provided. The electronic device includes a display, and at least one processor. The at least one processor may detect an execution of an application which provides an authentication service based on biometric information, changes at least one biometric information recognition related variable, in response to detecting the execution of the application, and may control to display an application execution screen including at least one authentication guide image corresponding to the at least one biometric information recognition related variable.

In accordance with another aspect of the disclosure, a method of operating an electronic device is provided. The method includes detecting an execution of an application which provides an authentication service based on biometric information, changing at least one biometric information recognition related variable, in response to detecting the execution of the application, and displaying an application execution screen including at least one authentication guide image corresponding to the at least one biometric information recognition related variable.

In accordance with another aspect of the disclosure, an electronic device is provided. The electronic device includes a display, a camera, and at least one processor. The at least one processor may obtain biometric information from an image input from the camera, may perform, based on the biometric information, a user authentication, detect whether an event for performing an operation corresponding to a user authentication success occurs, and may perform a function corresponding to the user authentication success, in response to detecting the event.

In accordance with another aspect of the disclosure, a method of operating an electronic device is provided. The method includes obtaining an image including biometric information, performing a user authentication based on the biometric information, detecting whether an event for performing an operation corresponding to a user authentication success occurs, and performing a function corresponding to the user authentication success, in response to the sense of the event.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 11A, 11B, 11C, and 11D illustrate a screen configuration and a concept diagram for performing the user authentication by controlling the authentication guide image for the reference area in the electronic device according to various embodiments of the disclosure;

FIGS. 12A, 12B, 12C, and 12D illustrate a screen configuration and a concept diagram for performing the user authentication by controlling the authentication guide image for the captured image in the electronic device according to various embodiments of the disclosure;

Throughout the drawings, like reference numerals will be understood to refer to like parts, components, and structures.

DETAILED DESCRIPTION

Figure 1:
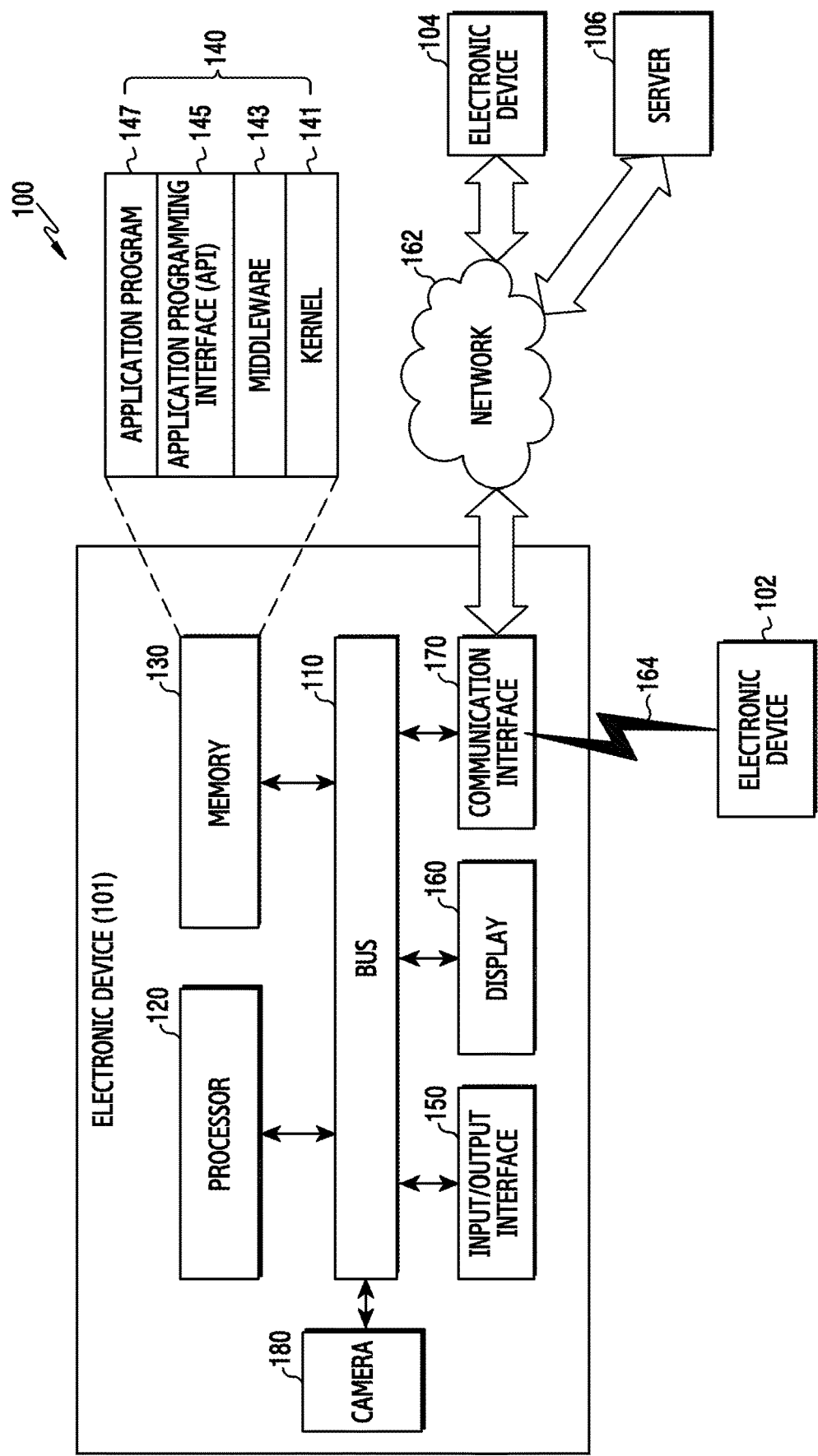
FIG. 1 illustrates a network environment including an electronic device according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the document, an expression "A or B", "A and/or B", or the like may include all possible combinations of items enumerated together. Although expressions such as "$1^{st}$", "$2^{nd}$", "first", and "second" may be used to express corresponding constitutional elements, it is not intended to limit the corresponding constitutional elements. When a certain (e.g., $1^{st}$) constitutional element is mentioned as being "operatively or communicatively coupled with/to" or "connected to" a different (e.g., $2^{nd}$) constitutional element, the certain constitutional element is directly coupled with/to another constitutional element or can be coupled with/to the different constitutional element via another (e.g., $3^{rd}$) constitutional element.

An expression "configured to" used in the present document may be interchangeably used with, for example, "suitable for", "having the capacity to", "adapted to", "made to", "capable of", or "designed to" in a hardware or software manner according to a situation. In a certain situation, an expressed "a device configured to" may imply that the device is "capable of" together with other devices or components. For example, "a processor configured to perform A, B, and C" may imply a dedicated processor (e.g., an embedded processor) for performing a corresponding operation or a generic-purpose processor (e.g., central processing unit (CPU) or an application processor) capable of performing corresponding operations by executing one or more software programs stored in a memory device.

An electronic device according to various embodiments of the disclosure, for example, may include at least one of a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an moving picture experts group phase 1 or phase 2 (MPEG-1 or MPEG-2) audio layer 3 (MP3) player, a mobile medical appliance, a camera, and a wearable device (e.g., smart glasses, a head-mounted-device (HMD), electronic clothes, an electronic bracelet, an electronic necklace, an electronic appcessory, an electronic tattoo, a smart mirror, or a smart watch).

According to some embodiments, the electronic device (ex. home appliance) may include at least one of, for example, a television, a digital versatile disc (DVD) player, an audio, a refrigerator, an air conditioner, a vacuum cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the disclosure may be a combination of one or more of the aforementioned various devices. The electronic device according to some embodiments of the disclosure may be a flexible device. Further, the electronic device according to an embodiment of the disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

In the following description, it is assumed that the first electronic device is an electronic device for a vehicle and the second electronic device is a smart key for remotely controlling the vehicle, for convenience of explanation. However, in various embodiments described below, the first electronic device and the second electronic device are not limited to the electronic device for the vehicle and the smart key.

FIG. 1 illustrates a network environment 100 including an electronic device according to various embodiments of the disclosure.

Referring to FIG. 1, the electronic device 101 may include a bus 110, a processor 120, a memory 130, an input/output interface 150, a display 160, a communication interface 170 and a camera 180. In an embodiment, the electronic device 101 may omit at least of the elements or add another element.

For example, the bus 110 may connect above-mentioned elements 120 to 180 with one another and include a circuit transferring communication (e.g., a control message and/or data) among the elements.

The processor 120 may include at least one of a CPU, an application processor (AP), an image signal processor (ISP), and a communication processor (CP). For example, the processor 120 may execute a control of at least one of other elements of the electronic device 101, a calculation related to communication, or a data processing.

According to various embodiments, the processor 120 may control to display an application execution screen, in a case in which an execution of an application which provides a user authentication service is detected. For example, the application providing the user authentication service may include an application which performs a user authentication for executing a function requested by a user, such as an application providing a lock function, and an application providing a payment function. The application execution screen may include a screen demanding a user authentication. For example, the screen demanding the user authentication may include a screen displaying a lock state, a biometric information input demand screen, a password input demand screen, a pattern input demand screen, a payment activation demand screen, and the like. According to an embodiment, the screen demanding the user authentication may include notification information related to a corresponding application. For example, a user authentication demand screen of an application providing a lock function may include information on a lock state, and notification information on an event (e.g., presence or not of an unchecked received message, presence or not of an unchecked call during a user's absence, presence or not of an unchecked application notification, and the like) generated in the electronic device. Alternatively, a user authentication demand screen of an application providing a payment function may include information on a payment activation demand and information (e.g., payment card information, payment account information, and the like) on a payment method.

According to various embodiments, the processor 120 may obtain the biometric information by the camera 180 in a state in which the application execution screen is displayed, and may perform, based on the obtained biometric information, a user authentication. For example, in a case in which the execution of the application providing the user authentication service is detected, the processor 120 may perform the user authentication based on the biometric information while displaying the application execution screen. The biometric information may be user intrinsic information obtained according to a body characteristic of the user. For example, the biometric information may include a physical characteristic which may be obtained by the camera 180, such as a shape of an iris of a user, a shape of a retina, a shape of a fingerprint, a shape of a vein in the vicinity of a wrist, a shape of an ear, a shape of a face, a shape of a hand, and the like. A type of the biometric information is not limited as long as the biometric information includes different characteristics according to users. According to an embodiment, the processor 120 may obtain a captured image by the camera 180, and may obtain the biometric information from the captured image using a reference area which is set for obtaining the biometric information. For example, the processor 120 may obtain iris information from the captured image using the reference area. According to an embodiment, the processor 120 may perform the user authentication by examining whether the obtained biometric information satisfies a predetermined condition. For example, the processor 120 may perform the user authentication by comparing the iris information obtained from the captured image with previously stored iris information.

According to various embodiments, in a case in which the execution of the application providing the user authentication service is detected, the processor 120 may change a biometric information recognition related variable. The biometric information recognition related variable may include a variable (e.g., a position, an angle, and/or a size of the reference area) indicating a state of the reference area for obtaining the biometric information, a variable (e.g., a position, an angle, and/or a size of the captured image) indicating a state of the captured image including the biometric information, and the like. The position, the size, and the angle of the captured image may be set in advance so that at least some of the captured image which is obtained from the camera 180 is displayed in a display area of the display 160. In addition, the position, the angle, and the size of the reference area may be set in advance so as to include at least some area of the display area of the display 160. For example, in a case in which an event for entering a lock screen is detected, the processor 120 may change the position of the reference area for obtaining the biometric information, or may change the position of the captured image. As another example, in a case in which the event for entering the lock screen is detected, the processor 120 may change the angle of the reference area, or may change the angle of the image captured by the camera 180. As yet another example, in a case in which the event for entering the lock screen is detected, the processor 120 may change the size of the reference area for obtaining the biometric information, or may change the size of the captured image. In various embodiments, changing the biometric information recognition related variable is for preventing an obtainment of the biometric information from the captured image in a situation in which a user does not intend to perform the user authentication, by controlling the position, the angle, and/or the size of the biometric information included in the captured image so as not to correspond to the position, the angle, and/or the size of the reference area. For example, in a state in which the user authentication demand screen is displayed on the electronic device, a user may desire to only identify information on the application included in the user authentication demand screen, without performing a user authentication. Therefore, in order to prevent the performance of the user authentication using the biometric information at a time point when a user does not intend to perform the user authentication, in a case in which the execution of the application providing the user authentication service is detected, the processor 120 according to various embodiments may change the size, the angle, and/or the position of the reference area, or may change the size, the angle, and/or the position of the captured image.

According to various embodiments, the processor 120 may control to display an authentication guide image for guiding the biometric information recognition related variable to a user. For example, after the processor 120 matches a first authentication guide image with the reference area, and then matches a second authentication guide image with the captured image, the processor 120 may control display position, angle and/or size of a first authentication guide image and a second authentication guide image, according to the positions, the angles, and/or the sizes of the reference area and the captured image. According to an embodiment, in a case in which the position of the reference area is changed from a predetermined position to another position, the processor 120 may control to change the display position of the first authentication guide image from a predetermined position to another position. In a case in which the position of the captured image is changed from a predetermined position to another position, the processor 120 may control to change the position of the second authentication guide image a predetermined position to another position. According to an embodiment, in a case in which the reference area is rotated from a predetermined angle by a first angle, the processor 120 may control to rotate a display angle of the first authentication guide image is rotated from a predetermined angle by the first angle. In a case in which the captured image is rotated from a predetermined angle by a second angle, the processor 120 may control to rotate a display angle of the second authentication guide image that is rotated from a predetermined angle by second angle. According to an embodiment, in a case in which the size of the reference area is expanded by a first magnification, the processor 120 may control to expand a display size of the first authentication guide image from a predetermined size by the first magnification. In a case in which the size of the reference area is expanded by a second magnification, the processor 120 may control to expand a display size of the second authentication guide image from a predetermined size by the second magnification. According to an embodiment, in a case in which the execution of the application providing the user authentication service is detected, the processor 120 may display the application execution screen including the first authentication guide image and the second authentication guide image. According to an embodiment, in a case in which the execution of the application providing the user authentication service is detected, after the processor 120 displays the application execution screen, the processor 120 may additionally display the first authentication guide image and the second authentication guide image.

According to various embodiments, the processor 120 may control to display the reference area and the captured image, and instead the processor 120 displays the first authentication guide image and the second authentication guide image.

According to various embodiments, the processor 120 may perform the user authentication by obtaining, based on the changed biometric information recognition related variable, the biometric information. For example, in a case in which the execution of the application providing the user authentication service is detected, the processor 120 may perform, based on the captured image obtained from the camera 180, a reference area of which a variable is changed, or based on a predetermined reference area and a captured image of which a variable is changed after the captured image is obtained from the camera 180, the user authentication. In a case in which the user authentication fails due to a biometric information obtainment failure or a biometric information difference, the processor 120 may repeatedly perform the user authentication. For example, at a first time point, a position, a size, and/or an angle of the biometric information in the captured image are/is not equal to the position, the size, and/or the angle of the reference area, the biometric information obtainment fails. However, a face angle of a user, a face position of the user, an angle of the electronic device, a position of the electronic device, a distance between the electronic device and the user, or the like is changed by various gestures of the user and thus the biometric information obtainment may be possible at a second time point. Therefore, a case in which a predetermined period is arrived, a case in which a gesture of a user is detected, or a case in which a movement of the electronic device is detected, the processor 120 may attempt to perform the user authentication again.

According to the various embodiments, the processor 120 may perform, based on a user input for the first authentication guide image or the second authentication guide image, the user authentication. For example, in a case in which the user input for the first authentication guide image or the second authentication guide image is detected, the processor 120 may update (change), based on the user input, the display of the first authentication guide image and/or the second authentication guide image, and may change, based on the user input, the biometric information recognition related variable, to perform the user authentication. According to an embodiment, the user input may be an input for restoring the changed biometric information recognition related variable into an original setting value. For example, in a case in which the position of the reference area is changed in response to detecting the execution of the application providing the user authentication service, the processor 120 may detect a user input (e.g., a drag input) for moving the position of the first authentication guide image which is matched with the reference area. The processor 120 may change, based on the reference area of which the position is changed, the display position of the first authentication guide image and the position of the reference area according to the detected user input, and may obtain the biometric information from the captured image, to perform the user authentication. As another example, in a case in which the angle of the reference area is changed in response to detecting the execution of the application providing the user authentication service, the processor 120 may detect a user input for changing the angle of the first authentication guide image which is matched with the reference area. The processor 120 may change, based on the reference area of which the angle is changed, the display angle of the first authentication guide image and the angle of the reference area according to the detected user input, and may obtain the biometric information from the captured image, to perform the user authentication. According to an embodiment, the user input may be an input for changing the biometric information recognition related variable which is not changed so as to be equal to the biometric information recognition related variable which is changed. For example, in a case in which the position of the reference area is changed in response to detecting the execution of the application providing the user authentication service, the processor 120 may detect a user input (e.g., a drag input) for moving the position of the second authentication guide image which is matched with the captured image. The processor 120 may change the display position of the second authentication guide image and the position of the captured image according to the detected user input, and may obtain the biometric information using the captured image of which the position is changed and the reference area of which the position is moved, to perform the user authentication. As another example, in a case in which the size of the captured image is changed in response to detecting the execution of the application providing the user authentication service, the processor 120 may detect a user input for changing the size of the first authentication guide image which is matched with the reference area. The processor 120 may change the display size of the first authentication guide image and the size of the reference area according to the detected user input, and may obtain the biometric information using the reference area of which the size is changed and the captured image of which the size is changed, to perform the user authentication.

According to various embodiments, the processor 120 may perform, based on a user input for notification information, the user authentication. According to an embodiment, in a case in which the user input for the notification information is detected, the processor 120 may determine that the user desires the user authentication to be performed, and may restore the previously changed biometric information recognition related variable into the original value, to perform the user authentication. For example, in a case in which the user input for the notification information is detected in a state in which the position of the reference area is changed in response to detecting the execution of the application providing the user authentication service, the processor 120 may restore the position of the reference area into an original position to perform the user authentication. As another example, in a case in which the user input for the notification information is detected in a state in which the size of the reference area is changed in response to detecting the execution of the application providing the user authentication service, the processor 120 may restore the size of the reference area into an original size to perform the user authentication. According to an embodiment, in a case in which the user input for the notification information is detected, the processor 120 may determine that the user desires the user authentication performance, and may change the biometric information recognition related variable which is not changed so as to be equal to the biometric information recognition related variable which is changed. For example, in a case in which the user input for the notification information is detected in a state in which the position of the reference area is changed in response to detecting the execution of the application providing the user authentication service, the processor 120 may change, based on the position of the reference area, the position of the captured image, and may perform the user authentication using the reference area and the captured image of which the positions are changed. As another example, in a case in which the user input for the notification information is detected in a state in which the size of the captured image is changed in response to detecting the execution of the application providing the user authentication service, the processor 120 may change, based on the size of the captured image, the size of the reference area, and may perform the user authentication using the captured image and the reference area of which the sizes are changed.

According to various embodiments, after the processor 120 performs, based on the biometric information, the user authentication in a state in which the application execution screen is displayed, the processor 120 may perform a function corresponding to the user authentication success by detecting a change event based on a user gesture. For example, when the application providing the user authentication service is executed, the processor 120 may control to display the application execution screen, and may perform the user authentication using a predetermined reference area and the image captured from the camera 180. In a case in which the user authentication is successful, the processor 120 may check whether a user gesture satisfying a predetermined condition is detected or not. The user gesture satisfying the predetermined condition may include a face rotation of a user, a face position movement of a user, a gesture for rotating the electronic device, a gesture for moving a position of the electronic device, a gesture for changing a distance between a user and the electronic device, and the like. According to an embodiment, in a case in which the user gesture satisfying the predetermined condition is detected in a state in which the user authentication is successful, the processor 120 may determine that the change event is detected, and may perform a function corresponding to the user authentication success. According to an embodiment, in a case in which the user gesture satisfying the predetermined condition is not detected in a state in which the user authentication is successful, the processor 120 may not perform the function corresponding to the user authentication success and may wait until the user gesture satisfying the predetermined condition is detected.

According to various embodiments, the processor 120 may set, based on the user input, whether or not to perform an unintended user authentication prevention function. The unintended user authentication prevention function may refer to a function for preventing an operation corresponding to the user authentication success, by preventing a successful performance of the user authentication using the biometric information recognition at a time point when a user does not intend to perform the user authentication. According to an embodiment, in a case in which a setting is made to perform the unintended user authentication prevention function by the user input, when the application providing the user authentication service is executed, the processor 120 may change the biometric information recognition related variable (e.g., the position, the angle, and/or the size of the reference area or the captured image). According to an embodiment, in a case in which a setting is made to perform the unintended user authentication prevention function by the user input, when the application providing the user authentication service is executed as described above, the processor 120 may add a condition for performing an operation corresponding to the user authentication success after the user authentication success.

According to various embodiments, in a case in which the user authentication is not successful in a predetermined time after the application providing the user authentication service is executed, the processor 120 may temporarily stop the user authentication performance. For example, the processor 120 may control not to temporarily perform the user authentication, by temporarily stopping a drive of the camera 180. The temporarily stopping of the user authentication performance is for reducing unnecessary power consumption. According to an embodiment, in a case in which the user input is detected in a state in which the user authentication performance is temporarily stopped, the processor 120 may control to start the user authentication performance again. For example, the processor 120 may drive the camera 180 again to control to perform the user authentication.

The memory 130 may include a volatile memory and/or a nonvolatile memory. For example, the memory 130 may store a command or data related to at least one of other elements in the electronic device 101. According to an embodiment, the memory 130 may store a software and/or a program 140. For example, the program 140 may include a kernel 141, a middleware 143, an application programming interface (API) 145, an application program (or an application) 147, or the like. At least some of the kernel 141, the middleware 143, and the API 145 may be referred to as an operating system (OS). According to an embodiment, the memory 130 may store the biometric information for the user authentication. The memory 130 may store information on a state (e.g., the position, the size, and/or the angle) of the reference area for obtaining the biometric information. The memory 130 may store information on a state (e.g., the position, the size, and/or the angle) of the captured image for obtaining the biometric information.

For example, the kernel 141 may control or manage system resources (e.g., the bus 110, the processor 120, the memory 130, etc.) used for executing an operation or a function implemented in other programs (e.g., the middleware 143, the API 145, or the application program 147). Further, the kernel 141 may provide an interface that enables the middleware 143, the API 145, or the application program 147 to access an individual component of the electronic device 101 to control or manage the system resources.

For example, the middleware 143 may function as a relay so that the API 145 or the application program 147 executes a communication with the kernel 141 to transmit and receive data to and from the kernel 141. Further, the middleware 143 may process at least one operation request received from the application program 147 according to a priority. For example, the middleware 143 may give a priority using the system resource (e.g., the bus 110, the processor 120, the memory 130, or the like) of the electronic device 101 to at least one among the application programs 147, and may process the at least one operation request. The API 145 is an interface used by the application 147 to control a function provided from the kernel 141 or the middleware 143, and may include, for example, at least one interface or function (e.g. a command) for a file control, a window control, an image processing, a character control, etc.

For example, the input/output interface 150 may function as an interface which may transfer a command or data input from a user or other external devices to the other element(s) of the electronic device 101. In addition, the input/output interface 150 may output the command or data received from the other element(s) of the electronic device 101 to the user or the other external devices. According to an embodiment, the input/output interface 150 may include a key pad, a dome switch, a physical button, a touch panel, a jog & shuttle. For example, the input/output interface 150 may be at least one sensor device capable of receiving sensor data related to biometric information, a movement, a temperature, a sound, an image, and the like.

For example, the display 160 may include a liquid crystal display (LCD), a light emitting diode (LED) display, an organic light emitting diode (OLED) display, a microelectromechanical systems (MEMS) display, or an electronic paper display. For example, the display 160 may display various types of contents (e.g., a text, an image, a video, an icon, a symbol, and/or the like) to a user. The display 160 may include a touch screen and receive an input of a touch using an electronic pen or a portion of a body of a user, a gesture, a proximity, or a hovering.

For example, the communication interface 170 may configure a communication between the electronic device 101 and an external electronic device (e.g., an electronic device 102, an electronic device 104, or a server 106). For example, the communication interface 170 may be connected to a network 162 by a wireless communication or a wired communication, and may communicate with the external device (e.g., the electronic device 104 or the server 106).

For example, the wireless communication may include a cellular communication using at least one of long term evolution (LTE), LTE Advance (LTE-A), code division multiple access (CDMA), Wideband CDMA (WCDMA), universal mobile telecommunication system (UMTS), wireless broadband (WiBro) and global system for mobile communication (GSM). According to an embodiment, for example, the wireless communication may include at least one (e.g., a short range communication 164) of Wi-Fi, Bluetooth (BT), Bluetooth low energy (BLE), Zigbee, near field communication (NFC), magnetic secure transmission (MST), radio frequency (RF), and body area network (BAN). According to an embodiment, the wireless communication may include GNSS. For example, the GNSS may be GPS, global navigation satellite system (Glonass), Beidou Navigation Satellite System (Beidou), or the European global satellite-based navigation system (Galileo). Hereinafter, in the disclosure, the "GPS" and the "GNSS" may be interchangeably used mutually. For example, the wired communication may include at least one of a universal serial bus (USB), a high definition multimedia interface (HDMI), power line communication, optical communication, plain old telephone service (POTS), and the like. The network 162 may include a telecommunication network, for example, at least one of a computer network (e.g., local area network (LAN) or wide area network (WAN)), an Internet and a telephone network.

The camera 180 may be driven by a control of the processor 120, and may obtain at least one captured image. According to an embodiment, the camera 180 may obtain the captured image including the biometric information, and may provide the obtained captured image to the processor 120.

Figure 2:
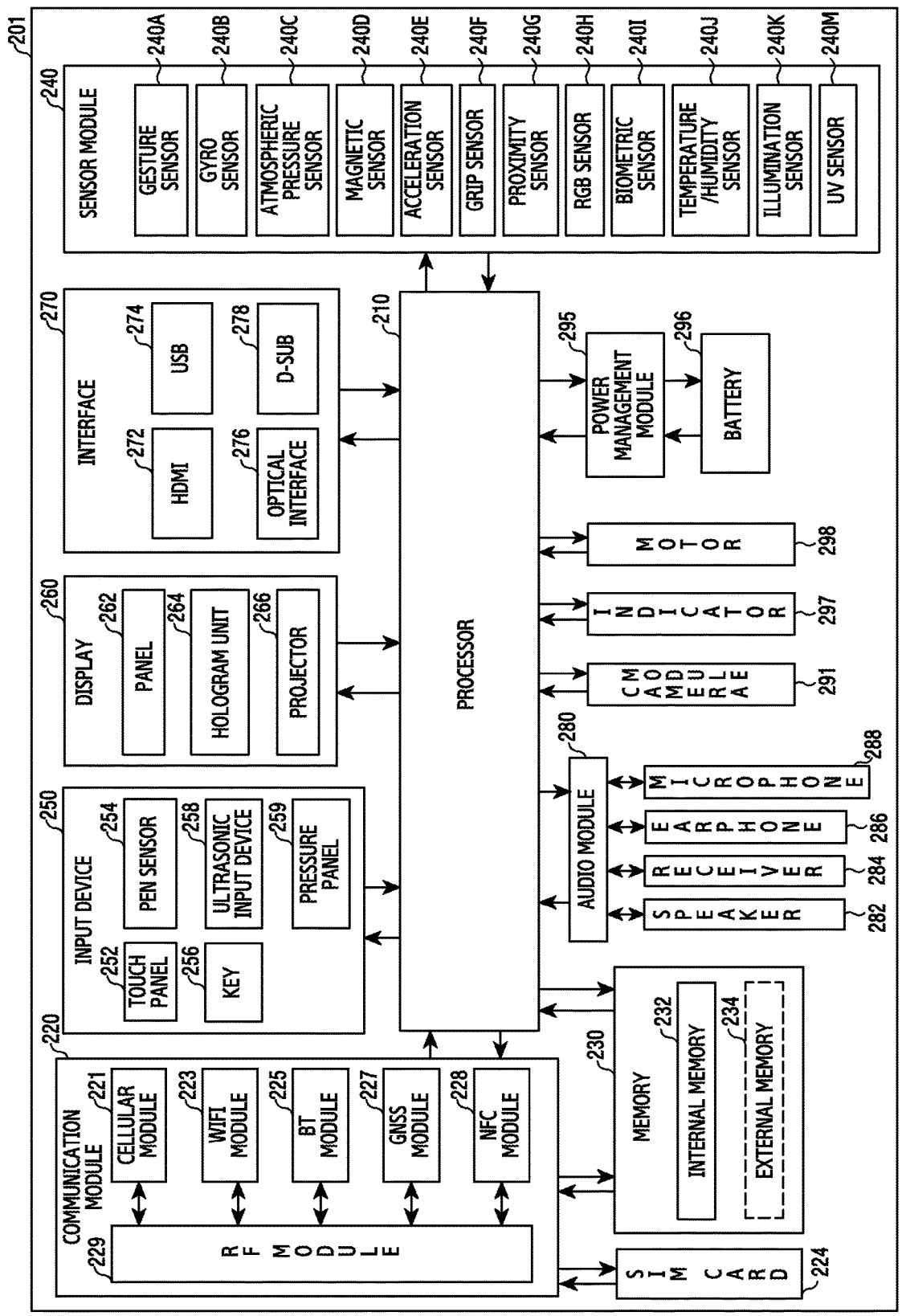
FIG. 2 illustrates a block diagram of an electronic device according to various embodiments of the disclosure.

FIG. 2 illustrates a block diagram of an electronic device 201 according to various embodiments of the disclosure. The electronic device 201 may include, for example, all or some of the electronic device 101 illustrated in FIG. 1.

Referring to FIG. 2, the electronic device 201 may include at least one processor (e.g., AP) 210, a communication module 220, a subscriber identifier module 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an operating system or an application program and process various data and perform calculations. The processor 210 may be implemented by, for example, a system on chip (SoC). According to an embodiment, the processor 210 may further include a graphic processing unit (GPU) and/or an image signal processor (ISP). The processor 210 may include at least some (e.g., the cellular module 221) of the elements illustrated in FIG. 2. The processor 210 may load an instruction or data received from at least one of other elements (e.g., a nonvolatile memory) to a volatile memory to process the instruction or data, and may store result data in the nonvolatile memory.

According to an embodiment, the processor 120 may control to obtain, based on the reference area, the biometric information from the captured image and perform, based on the obtained biometric information, the user authentication. According to an embodiment, in a case in which the execution of the application providing the user authentication service is detected, the processor 120 may change the biometric information recognition related variable (e.g., a variable indicating a state of the reference area or the captured image) to prevent the performance of the user authentication in a situation in which a user does not intend to perform the user authentication.

The communication module 220 may include a configuration equal or similar to that of the communication interface 170 of FIG. 1. For example, the communication module 220 may include a cellular module 221, a Wi-Fi module 223, a Bluetooth module 225, a GNSS module 227, an NFC module 228, and a RF module 229.

For example, the cellular module 221 may provide a voice call, a video call, a short message service, or an Internet service by a communication network. According to an embodiment, the cellular module 221 may distinguish and authenticate the electronic device 201 within a communication network using, for example, a Subscriber Identification Module (for example, the SIM card 224). According to an embodiment, the cellular module 221 may perform at least a part of functions that may be provided by the processor 210. According to an embodiment, the cellular module 221 may include a CP.

According to an embodiment, at least some (e.g., two or more) of the cellular module 221, the Wi-Fi module 223, the Bluetooth module 225, the GNSS module 227, and the NFC module 228 may be included in one Integrated Chip (IC) or an IC package.

The RF module 229 may transmit/receive, for example, a communication signal (e.g., an RF signal). The RF module 229 may include, for example, a transceiver, a power amplifier module (PAM), a frequency filter, a low noise amplifier (LNA), an antenna, or the like. According to another embodiment, at least one of the cellular module 221, the Wi-Fi module 223, the Blue tooth module 225, the GNSS module 227, and the NFC module 228 may transmit/receive an RF signal by a separate RF module. For example, the subscriber identifier module 224 may include a card including a subscriber identification module or an imbedded subscriber identity module (SIM), and may include an integrated circuit card IDentifier (ICCID) or subscriber information (for example, an international mobile subscriber identity (IMSI)).

For example, the memory 230 (e.g., the memory 130 of FIG. 1) may include an internal memory 232 or an external memory 234. The internal memory 232 may include, for example, at least one of a volatile memory (e.g., a dynamic random-access memory (DRAM), an static random access memory (SRAM), an synchronous DRAM (SDRAM), or the like), and a non-volatile Memory (e.g., a one time programmable ROM (OTPROM), a PROM, an erasable programmable read-only memory (EPROM), an electrically EPROM (EEPROM), a mask ROM, a flash ROM, a flash memory, a hard drive, a solid state drive (SSD), and the like). The external memory 234 may further include a flash drive, for example, a compact flash (CF), a secure digital (SD), a micro secure digital (Micro-SD), a mini Secure Digital (Mini-SD), an extreme digital (xD), a multi-media card (MMC), a memory stick, or the like. The external memory 234 may be functionally or physically connected with the electronic device 201 by various interfaces.

The sensor module 240 may measure a physical quantity or detect an operation state of the electronic device 201, and may convert the measured or detected information to an electrical signal. The sensor module 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, red, green, and blue (RGB) sensor), a bio-sensor 240I, a temperature/humidity sensor 240J, an illumination sensor 240K, and a ultra violet (UV) sensor 240M. For example, the sensor module 240 may include an E-nose sensor, an electromyography (EMG) sensor, an electroencephalogram (EEG) sensor, an electrocardiogram (ECG) sensor, an Infrared (IR) sensor, an iris sensor, a fingerprint sensor, and the like. The sensor module 240 may further include a control circuit for controlling one or more sensors included therein. The electronic device 201 may further include a processor configured to control the sensor module 240 as a portion of the processor 210 or in addition to the processor 210, to control the sensor module 240 while the processor 210 is in a sleep state. For example, the temperature/humidity sensor 240J may include a plurality of temperature sensor disposed different positions.

For example, the input device 250 may include a touch panel 252, a (digital) pen sensor 254, a key 256, an ultrasonic input device 258, or a pressure panel 259. The touch panel 252 may use at least one of a capacitive type, a resistive type, an infrared type, and an ultrasonic wave type. In addition, the touch panel 252 may further include a control circuit. The touch panel 252 may further include a tactile layer to provide a tactile reaction to a user. For example, the (digital) pen sensor 254 may be a portion of the touch panel, or may include a separate recognition sheet. The key 256 may include, for example, a physical button, an optical key, or a keypad. The ultrasonic input device 258 may detect an ultrasonic wave generated from an input equipment with a microphone (e.g., a microphone 288) to identify data corresponding to the detected ultrasonic wave.

The display 260 (e.g. the display 160 of FIG. 1) may include a panel 262, a hologram device 264, a projector 266, and/or a control circuit for controlling the panel 262, the hologram device 264, or the projector 266. The panel 262 may be implemented to be, for example, flexible, transparent, or wearable. The panel 262 may be configured by the touch panel 252 and at least one module. The hologram device 264 may show a stereoscopic image in the air using an interference of light. The projector 266 may project light onto a screen to display an image. The screen may be located, for example, an inside or an outside the electronic device 201. The interface 270 may include, for example, a HDMI 272, a USB 274, an optical interface 276, or a D-subminiature (D-sub) 278. The interface 270 may be included in, for example, the communication interface 170 illustrated in FIG. 1. Additionally or alternatively, the interface 270 may include, for example, a mobile high-definition link (MHL) interface, a SD card/multi-media card (MMC) interface, or an infrared data association (IrDA) standard interface.

For example, the audio module 280 may bilaterally convert a sound and an electrical signal. At least some elements of the audio module 280 may be included in, for example, the input/output interface 150 illustrated in FIG. 1. The audio module 280 may process sound information input or output by, for example, the speaker 282, the receiver 284, the earphones 286, the microphone 288 or the like.

The camera module 291 is a device for capturing a still image or a video, and according to an embodiment, may include one or more image sensors (e.g., a front sensor or a rear sensor), a lens, an image signal processor (ISP), or a flash (e.g., an LED or a xenon lamp). The camera module 291 may capture an image including the biometric information.

For example, the power management module 295 may manage power of the electronic device 201. The power management module 295 may include a power management integrated circuit (PMIC), a charger integrated circuit (IC), or a battery or fuel gauge. The PMIC may have a wired charging method and/or a wireless charging method. For example, the wireless charging method may include a magnetic resonance scheme, a magnetic induction scheme, or an electromagnetic wave scheme, and may further include an additional circuit for a wireless charging, such as a coil loop circuit, a resonance circuit, a rectifier, or the like. The battery gauge may measure, for example, a remaining quantity of the battery 296, or a voltage, a current, or a temperature during the charging. The battery 296 may include, for example, a rechargeable battery or a solar battery.

The indicator 297 may display a specific status of the electronic device 201 or a part (e.g. the processor 210) of electronic device, for example, a booting status, a message status, a charging status, or the like. The motor 298 may convert an electrical signal to a mechanical vibration, and may generate a vibration or haptic effect. For example, the electronic device 201 may include a mobile TV support device (e.g., a GPU) capable of processing for example, media data according to a standard of digital multimedia broadcasting (DMB), digital video broadcasting (DVB), media flow (mediaFlo™) or the like.

The each of elements described in the disclosure may be configured by one or more components, and the names of the elements may be changed according to the type of the electronic device. According to various embodiments, in the electronic device (e.g., the electronic device 201), some elements may be omitted, or additional components may be further included in the electronic device. Some of the elements of the electronic device may be combined into one entity and perform the same functions as the previous elements prior to the combination.

Figure 3:
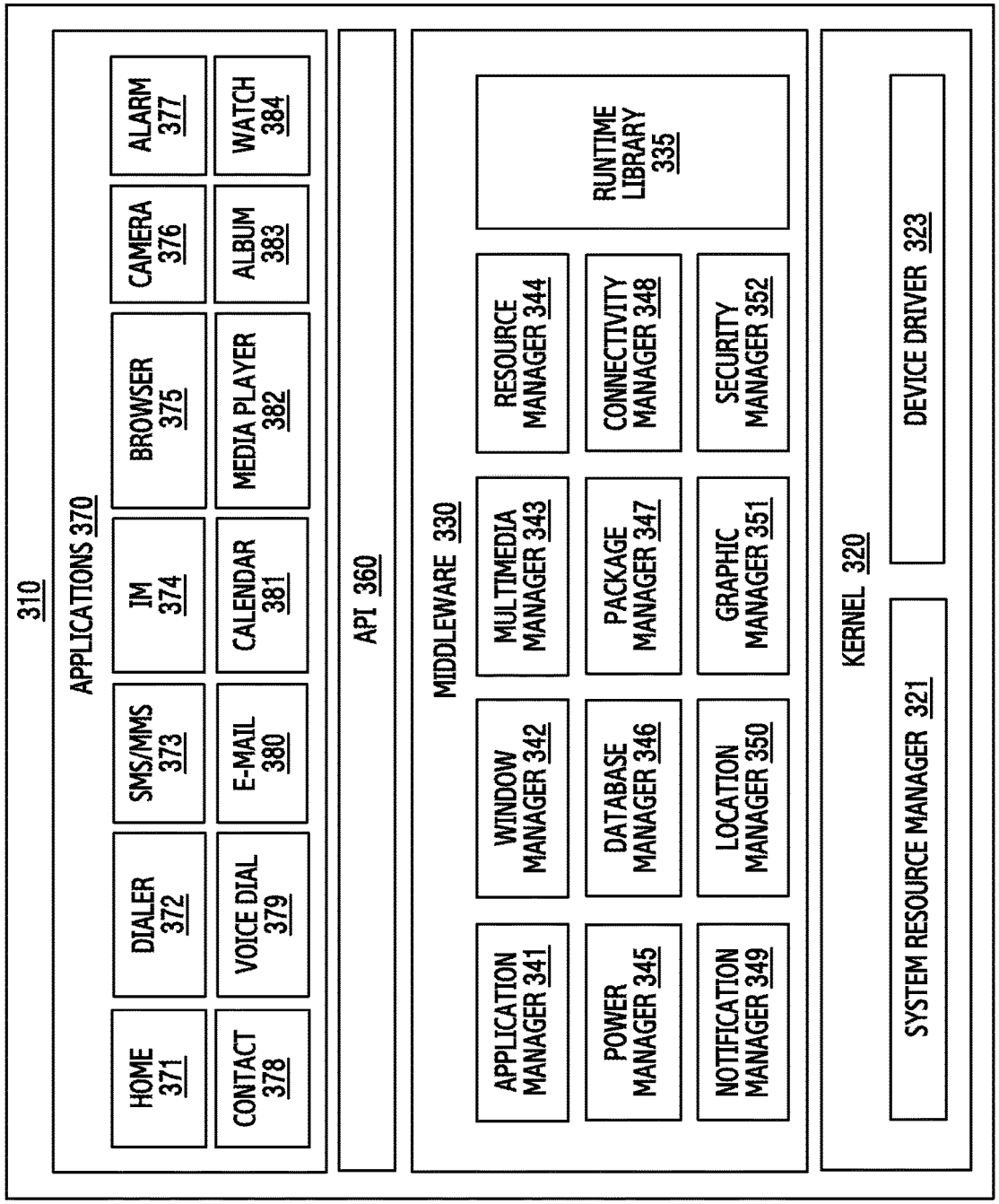
FIG. 3 is a block diagram of a program module according to various embodiments of the disclosure.

FIG. 3 is a block diagram of a program module according to various embodiments of the disclosure. According to an embodiment, the program module 310 (for example, the program 140) may include an OS for controlling resources related to the electronic device (for example, the electronic device 101) and/or various applications (for example, the application programs 147) executed in the operating system. The operating system may include, for example, Android™, iOS™, Windows™, Symbian™, Tizen™, Bada™, or the like.

Referring to FIG. 3, the program module 310 may include a kernel 320 (e.g., the kernel 141), a middleware 330 (e.g., the middleware 143), an API 360 (e.g., the API 145), and/or an applications 370 (e.g., the application program 147). At least some of the program module 310 may be preloaded in the electronic device or downloaded from an external electronic device (e.g., the electronic devices 102 and 104, the server 106, or the like).

For example, the kernel 320 may include a system resource manager 321 and/or a device driver 323. The system resource manager 321 may control, allocate, or collect the system resources. According to an embodiment, the system resource manager 321 may include a process manager, a memory manager, or a file system manager. The device driver 323 may include, for example, a display driver, a camera driver, a Bluetooth driver, a shared-memory driver, a USB driver, a keypad driver, a Wi-Fi driver, an audio driver, a touch device driver, a pressure device driver, or an inter-process communication (IPC) driver.

For example, the middleware 330 may provide a function used by the applications 370 in common or provide various functions to the applications 370 by the API 360 so that the applications 370 may use limited system resources in the electronic device. According to an embodiment, the middleware 330 may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The run time library 335 may include, for example, a library module used by a compiler in order to add new functions by a programming language while the applications 370 is executed. The run time library 335 may perform input/output management, memory management, or a process for an arithmetic function. The application manager 341 may manage, for example, a life cycle of the applications 370. According to an embodiment, the application manager 341 may transmit, based on contents request of the applications 370, a biometric information request signal to the security manager 352. The application manager 341 may provide contents information received from the database manager 346 to the applications 370. The window manager 342 may manage a GUI resource used in the screen. The multimedia manager 343 may detect a format used for reproducing various media files and encode or decode a media file using a codec appropriate for the corresponding format. The resource manager 344 may manage a source code or a storage space of the applications 370. For example, the power manager 345 may manage capacity of a battery or power, and may provide information on power used in an operation of the electronic device. According to an embodiment, the power manager 345 may operate together with a basic input/output system (BIOS). For example, the database manager 346 may generate, search for, or change a database to be used by the applications 370. According to an embodiment, the database manager 346 may search for the database and may detect contents matched with the biometric information provided from the security manager 352. The package manager 347 may manage the installation or the updating of applications distributed in the form of package file. For example, the connectivity manager 348 may manage wireless connections. For example, the notification manager 349 may provide an event such as a received message, an appointment, and a proximity notification to a user. For example, the location manager 350 may manage location information of the electronic device. For example, the graphic manager 351 may manage graphic effects to be provided to a user and user interfaces related to the graphic effects. For example, the security manager 352 may provide a system security or a user authentication. According to an embodiment, the security manager 352 may collect, based on the biometric information request signal provided from the application manager 341, the biometric information by the bio-sensor 240I.

According to an embodiment, the middleware 330 may include a middleware module for forming a combination of various functions of a telephony manager for managing a function of the voice call or the video call of the electronic device or the aforementioned elements. According to an embodiment, the middleware 330 may provide modules specialized according to types of operating systems. In addition, a few exiting elements may be dynamically removed from the middleware 330, or new elements may be added to the middleware 330. For example, the API 360 is a set of API programming functions, and a different configuration thereof may be provided according to an operating system. For example, with respect to each platform, one API set may be provided in a case of Android or iOS, and two or more API sets may be provided in a case of Tizen.

The applications 370 may include, for example, an application which provides a function such as home 371, dialer 372, short message system (SMS)/multimedia messaging service (MMS) 373, instant message (IM) 374, browser 375, camera 376, alarm 377, contacts 378, voice dial 379, email 380, calendar 381, media player 382, album 383, watch 384, health care (for example, measure exercise quantity or blood sugar), or environment information (for example, atmospheric pressure, humidity, or temperature information). According to an embodiment, the applications 370 may include an information exchange application supporting information exchange between the electronic device and external electronic devices. The information exchange application may include, for example, a notification relay application for transmitting specific information to the external electronic device, or a device management application for managing the external electronic device. For example, the notification relay application may transfer notification information generated from another application in the electronic device to an external electronic device, or may receive notification information from an external electronic device to provide the notification information to a user. For example, the device management application may install, delete, or update a function of the external electronic device communicating with the electronic device (for example, a function of turning on/off the external electronic device itself (or some components) or a function of adjusting luminance (or a resolution) of the display, applications operating in the external electronic device. According to an embodiment, the applications 370 may include an application (for example, health management application of a mobile medical device) designated according to attributes of the external electronic device. According to an embodiment, the applications 370 may include an application received from the external electronic device. According to an embodiment, the applications 370 may include an application providing a user authentication service. For example, the application providing the user authentication service may include applications perform a user authentication for executing a function requested by a user, such as an application providing a lock function, and an application providing a payment function. At least some of the program module 310 may be implemented (e.g., executed) by a software, a firmware, a hardware (e.g., the processor 210), or a combination of at least two of the software, firmware, and hardware, and may include a module, a program, a routine, an instruction set, or a process for performing at least one function.

According to various embodiments, an electronic device may include a display, and at least one processor. The at least one processor may detect an execution of an application which provides an authentication service based on biometric information, change at least one biometric information recognition related variable, in response to detecting the execution of the application, and control the display to display an application execution screen including at least one authentication guide image corresponding to the at least one biometric information recognition related variable.

According to various embodiments, the electronic device may further include a camera configured to obtain a captured image including the biometric information. The at least one biometric information recognition related variable may include at least one of a variable indicating a state of a reference area which is set for recognizing the biometric information from the captured image, and a variable indicating a state of the captured image.

According to various embodiments, the at least one biometric information recognition related variable may include at least one of a position of the reference area, an angle of the reference area, a size of the reference area, a position of the captured image, an angle of the captured image, and a size of the captured image.

According to various embodiments, the at least one authentication guide image may include at least one of a first authentication guide image corresponding to the reference area, and a second authentication guide image corresponding to the captured image.

According to various embodiments, the at least one processor may control, based on a value obtained by a change of the at least one biometric information recognition related variable, a display of the at least one authentication guide image.

According to various embodiments, the at least one processor may change the at least one biometric information recognition related variable from a predetermined first value to a second value, in response to detecting the execution of the application, and the second value may be a random value or a value determined according to a predetermined regulation.

According to various embodiments, the display may include a touch sense display configured to detect a user input, and the at least one processor may detect a user input for the at least one authentication guide image, update, based on the user input, a display of the at least one authentication guide image, and update, based on the user input, the at least one biometric information recognition related variable.

According to various embodiments, the display may include a touch sense display configured to detect a user input, the application execution screen may include at least one notification information related to the application, and the at least one processor may detect a user input for the notification information, and restore the at least one biometric information recognition related variable into an original value, in response to the user input.

According to various embodiments, the at least one processor may perform, based on the at least one biometric information recognition related variable, a user authentication.

According to various embodiments, an electronic device may include a display, a camera, and at least one processor. The at least one processor may be configured to obtain biometric information from an image input from the camera, perform, based on the biometric information, a user authentication, detect whether an event for performing an operation corresponding to a user authentication success occurs, and perform a function corresponding to the user authentication success, in response to detecting the event.

According to various embodiments, the processor may be configured to drive at least one sensor, in response to the success of the user authentication, and detect whether the event for performing the operation corresponding to the user authentication success occurs using the at least one driven sensor.

Figure 4:
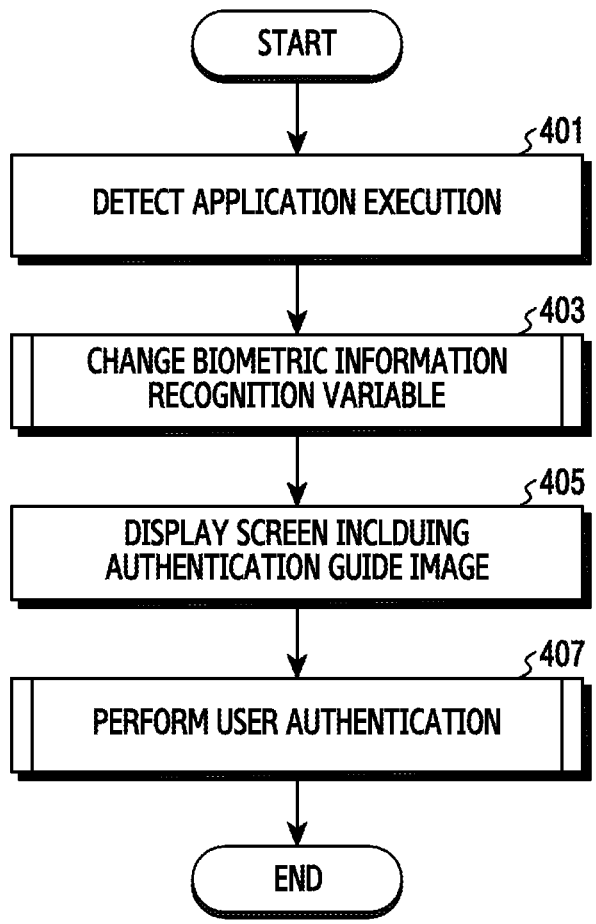
FIG. 4 illustrates a flowchart for performing a user authentication in an electronic device according to various embodiments of the disclosure.
Figure 5A:
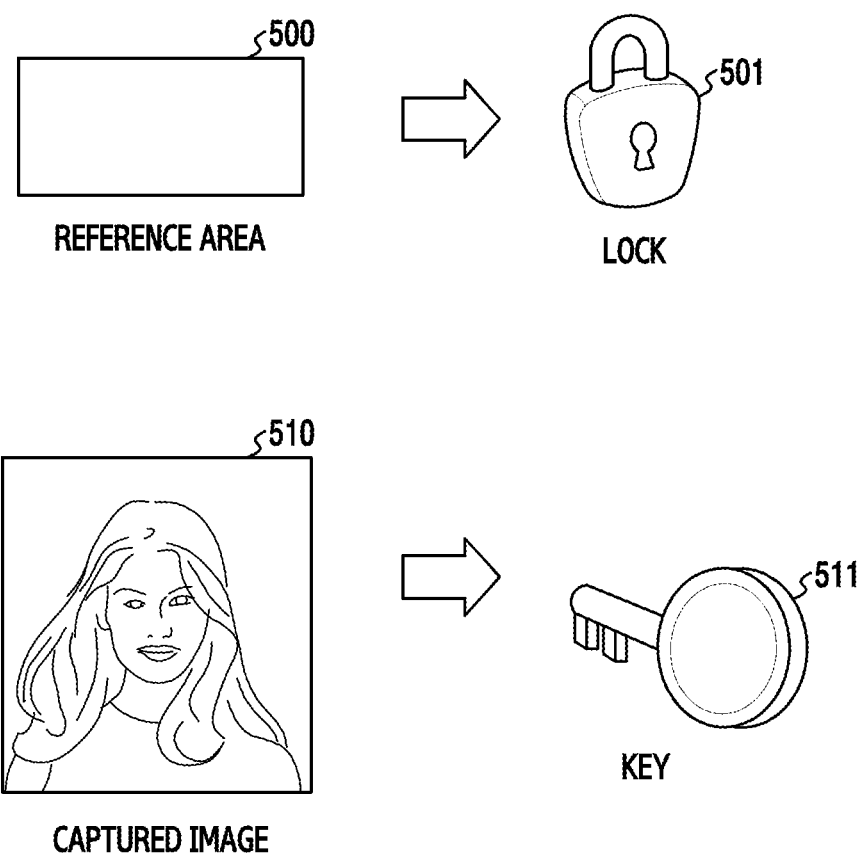
FIG. 5A illustrates an authentication guide image for a reference area and a captured image for a biometric information recognition in the electronic device according to various embodiments of the disclosure.
Figure 5B:
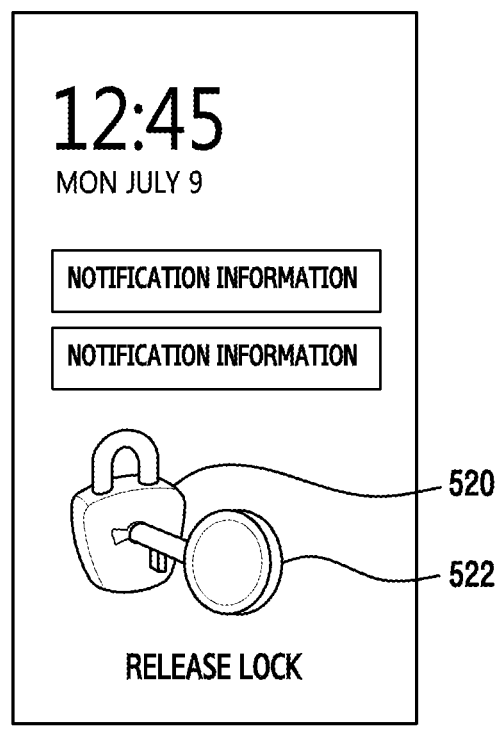
FIGS. 5B and 5C illustrate a screen configuration providing the authentication guide image for the biometric information recognition in the electronic device according to various embodiments of the disclosure.
Figure 5C:
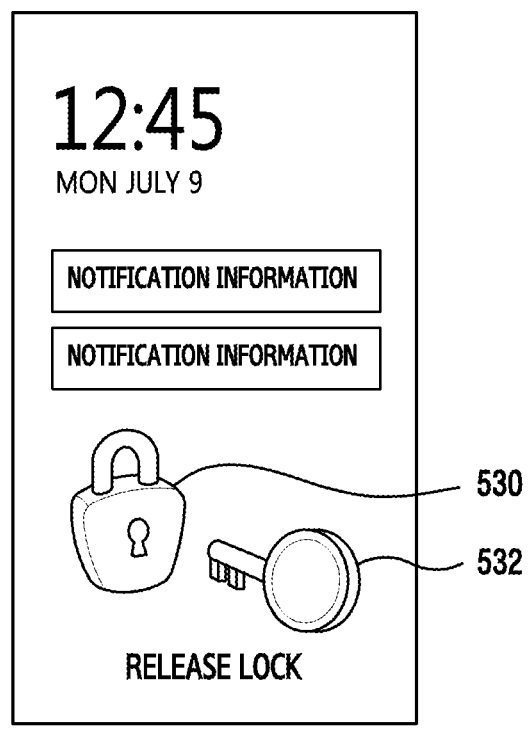

FIG. 4 illustrates a flowchart for performing the user authentication in an electronic device according to various embodiments of the disclosure. FIG. 5A illustrates an authentication guide image for a reference area and a captured image for a biometric information recognition in the electronic device according to various embodiments of the disclosure. FIGS. 5B and 5C illustrate a screen configuration providing the authentication guide image for the biometric information recognition in the electronic device according to various embodiments of the disclosure. In the following embodiment, each of operations may be sequentially performed, but is not limited thereto. For example, a sequence of each of the operations may be changed, and two or more operations may be performed in parallel. The electronic device may be the electronic device 101 of FIG. 1.

Referring to FIG. 4, at operation 401, the electronic device may detect, based on the user input, the execution of the application. According to an embodiment, the electronic device may detect the execution of the application providing the user authentication service. For example, the application providing the user authentication service may include an application which performs a user authentication for executing a function requested by a user, such as an application providing a lock function, and an application providing a payment function.

At operation 403, the electronic device changes the biometric information recognition related variable. According to various embodiments, the electronic device may change the biometric information recognition related variable, in response to detecting the execution of the application providing the user authentication service. The biometric information recognition related variable may include a variable (e.g., a position, an angle, and/or a size of the reference area) indicating a state of the reference area for obtaining the biometric information, a variable (e.g., a position, an angle, and/or a size of the captured image) indicating a state of the captured image including the biometric information, and the like. For example, in a case in which an execution event of the application providing the user authentication service is detected, the electronic device may change the position of the reference area for obtaining the biometric information from a predetermined position to another position. As another example, in a case in which an execution event of the application providing the user authentication service is detected, the electronic device may drive the camera 180 and rotate the image captured by the camera 180, to change the angle of the captured image from a predetermined angle to another angle. As yet another example, in a case in which in a case in which an execution event of the application providing the user authentication service is detected, the electronic device may increase or reduce the reference area for obtaining the biometric information, to change the size of the reference area. In various embodiments, changing the biometric information recognition related variable is for preventing an obtainment of the biometric information from the captured image in a situation in which a user does not intend to perform the user authentication, by controlling the position, the angle, and/or the size of the biometric information included in the captured image so as not to be equal to the position, the angle, and/or the size of the reference area.

At operation 405, the electronic device displays the application execution screen including the authentication guide image corresponding to the biometric information recognition related variable. The application execution screen may include a screen (e.g., a screen displaying a lock state, a biometric information input demand screen, a password input demand screen, a pattern input demand screen, a payment activation demand screen, and the like) demanding a user authentication. According to various embodiments, the electronic device may display an application execution screen including an authentication guide image for guiding the change of the biometric information recognition related variable to a user. For example, after the electronic device matches the first authentication guide image with the reference area and matches the second authentication guide image with the captured image, the electronic device may display the first authentication guide image and the second authentication guide image in the display for demanding the user authentication according to the positions, the angles, and/or the sizes of the reference area and the captured image.

As a specific example, after the electronic device matches a reference area 500 with a lock image 501 and matches a captured image 510 with a key image 511 as illustrated in FIG. 5A, the electronic device may display lock images 520 and 530 and key images 522 and 532 in a screen displaying a lock state as illustrated in FIGS. 5B and 5C. The electronic device may change positions, angles, and/or sizes of the lock images 520 and 530 and the key images 522 and 532 and display the lock images 520 and 530 and the key images 522 and 532, in order to inform that the biometric information recognition related variable, for example, a variable indicating a state of the reference area or the captured image, is changed to a user. For example, at operation 403, in a case in which the angle of the reference area is changed, as illustrated in FIG. 5B, the electronic device may change an angle of at least some of the lock image 520 by the changed angle of the reference area and display the lock image 520. The electronic device may notify, to a user, that a state in which the biometric information obtainment is impossible and/or a state in which the user authentication using the biometric information is impossible due to an angle difference between the reference area and the captured image, by displaying the lock image 520 and the key image 522 so that the angle of the at least some (e.g., a groove portion matched with the key image) of the lock image 520 is not matched with the angle of the key image 522. As another example, at operation 403, in a case in which the position of the captured image is changed, as illustrated in FIG. 5C, the electronic device may change the position of the key image 532 by the changed position of the captured image and display the key image 532. The electronic device may notify, to a user, that a state in which the biometric information obtainment is impossible and/or a state in which the user authentication using the biometric information is impossible due to a position difference between the reference area and the captured image, by displaying the key image 532 and the lock image 530 so that the position of the key image 532 is not matched with at least some (e.g., a groove portion matched with the key image) of the lock image 530. For example, the electronic device may notify that a face of a user is required to be moved or the electronic device is required to be moved for the user authentication, by controlling, based on the changed biometric information recognition related variable, a display state (e.g., the position, the angle, and/or the size) of the first authentication guide image or the second authentication guide image. According to various embodiments, the application execution screen may include notification information related to a corresponding application. For example, an application execution screen providing a lock function may include information on a lock state and notification information on an event (e.g., presence or not of an unchecked received message, presence or not of an unchecked call during one's absence, presence or not of an unchecked application notification, and the like) generated in the electronic device. As another example, an application execution screen providing a payment function may include information on a payment activation demand and information (e.g., payment card information, payment account information, and the like) on a payment method.

At operation 407, the electronic device performs the user authentication using the reference area and the captured image. According to an embodiment, attempts, based on the reference area and the captured image of which the variable is changed, or based on the captured image and the reference area of which the variable is changed, the biometric information obtainment, and may perform, based on the obtained biometric information, the user authentication, in a case in which the biometric information is obtained. In a case in which the user authentication is successful, the electronic device may perform an operation corresponding to the user authentication success, and in a case in which the user authentication fails, the electronic device may inform of that the user authentication fails. In a case in which a user moves a face of the user or the electronic device according to the authentication guide image display of the operation 405, the electronic device may obtain, based on the reference area and the captured image of which the variable is changed, or based on the captured image or the reference area of which the variable is changed, the biometric information, and may perform, based on the obtained biometric information, the user authentication. According to an embodiment, the electronic device may perform, based on the user input for the first authentication guide image or the second authentication guide image, the user authentication. For example, in a case in which the user input for the first authentication guide image and/or the second authentication guide image is detected, the electronic device may update (or change), based on the user input, the display of the first authentication guide image and/or the second authentication guide image, and may change, based on the user input, the biometric information recognition related variable, to perform the user authentication. According to an embodiment, the electronic device may perform, based on the user input for the notification information, the user authentication. For example, in a case in which the user input for the notification information is detected, the electronic device may determine that a user desires to perform the user authentication, and may restore the previously changed biometric information recognition related variable into the original value, to perform the user authentication. As another example, in a case in which the user input for the notification information is detected, the electronic device may determine that a user desires to perform the user authentication, and may change the biometric information recognition related variable which is not changed so as to be equal to the biometric information recognition related variable which is changed, to perform the user authentication.

In the above description, in order to inform that the variable indicating the state of the reference area or the captured image is changed, the first and second authentication guide images matched with the reference area and the captured image respectively are displayed, but according to an embodiment, the electronic device may directly display the reference area and the captured image.

In the above description, the application execution screen including the authentication guide image is displayed in operation 405, but according to an embodiment, after the electronic device displays the application execution screen in response to detecting the execution of the application in operation 401, and may additionally display the authentication guide image in the application execution screen in operation 405.

Figure 6:
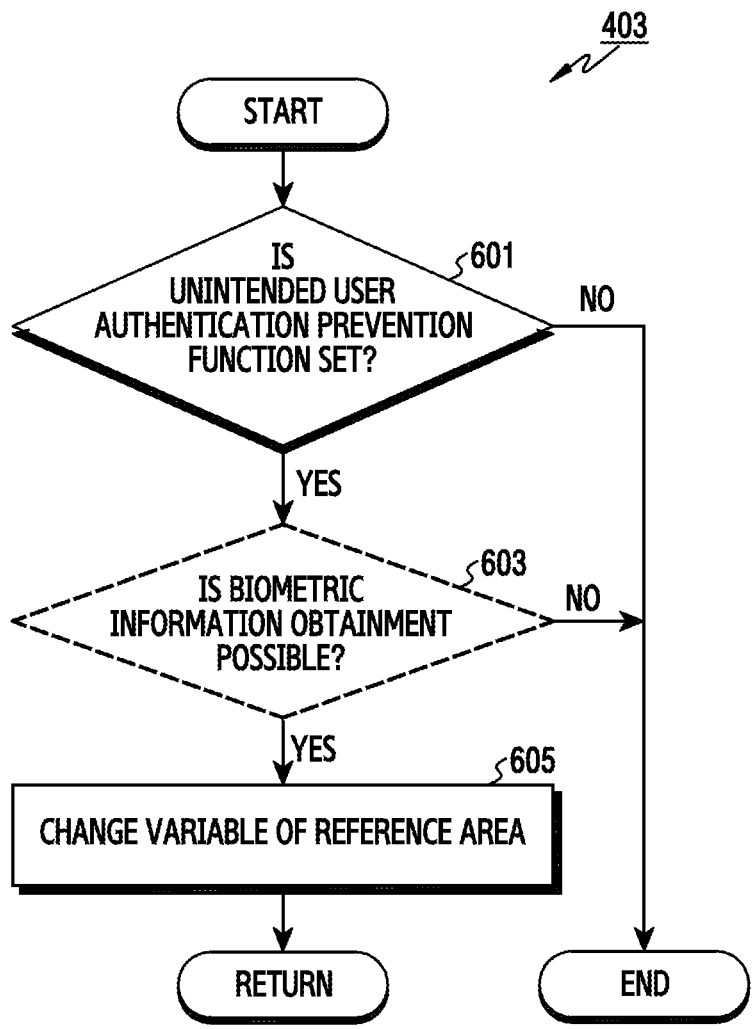
FIG. 6 illustrates a flowchart for changing a variable of the reference area in the electronic device according to various embodiments of the disclosure.

FIG. 6 illustrates a flowchart for changing the variable of the reference area in the electronic device according to various embodiments of the disclosure. FIGS. 7A, 7B, 7C, and 7D illustrate a predetermined reference area and a changed reference area in the electronic device according to various embodiments of the disclosure. Hereinafter, an operation of changing the biometric information recognition variable by the electronic device at operation 403 of FIG. 4 is described in detail. In the following embodiment, each of operations may be sequentially performed, but is not limited thereto. For example, a sequence of each of the operations may be changed, and two or more operations may be performed in parallel. The electronic device may be the electronic device 101 of FIG. 1. An operation of a block shown as a dotted line in FIG. 6 may be omitted according to an embodiment.

Referring to FIG. 6, at operation 601, the electronic device examines whether a setting is made so as to perform the unintended user authentication prevention function. The unintended user authentication prevention function may refer to a function for preventing an operation corresponding to the user authentication success, by preventing a successful performance of the user authentication using the biometric information recognition at a time point when a user does not intend to perform the user authentication. The performance or not of the unintended user authentication prevention function may be set by the user input. In a case in which a setting is made so as not to perform the unintended user authentication prevention function, the electronic device ends procedures according to various embodiments.

In a case in which a setting is made so as to perform the unintended user authentication prevention function, at operation 603, the electronic device examines whether the biometric information obtainment is possible. For example, the electronic device examines whether the biometric information obtainment is possible, using a predetermined reference area and the captured image received from the camera 180. For example, the electronic device examines whether the biometric information for the user authentication is present in an area of the captured image corresponding to the reference area. In a case in which the biometric information for the user authentication is present in the area of the captured image corresponding to the reference area, the electronic device may determine that the biometric information obtainment is possible, and in a case in which the biometric information for the user authentication is not present in the area of the captured image corresponding to the reference area, the electronic device may determine that the biometric information obtainment is impossible. In a case in which the biometric information obtainment is impossible, the electronic device ends procedures according to various embodiments. For example, in a case in which the biometric information obtainment is impossible, the electronic device determines that the unintended user authentication is not performed, and ends procedures according to various embodiments.

Figure 7A:
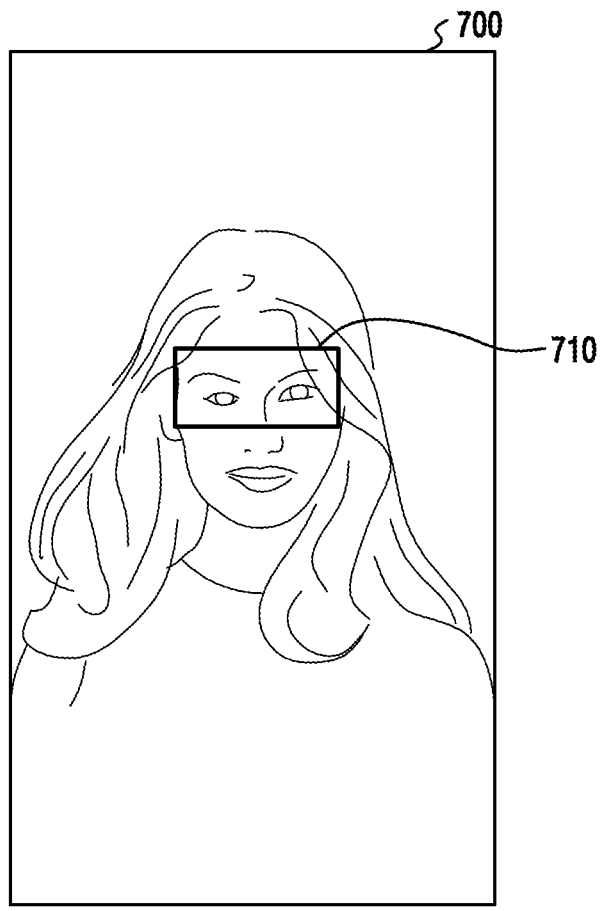
FIGS. 7A, 7B, 7C, and 7D illustrate a predetermined reference area and a changed reference area in the electronic device according to various embodiments of the disclosure.
Figure 7B:
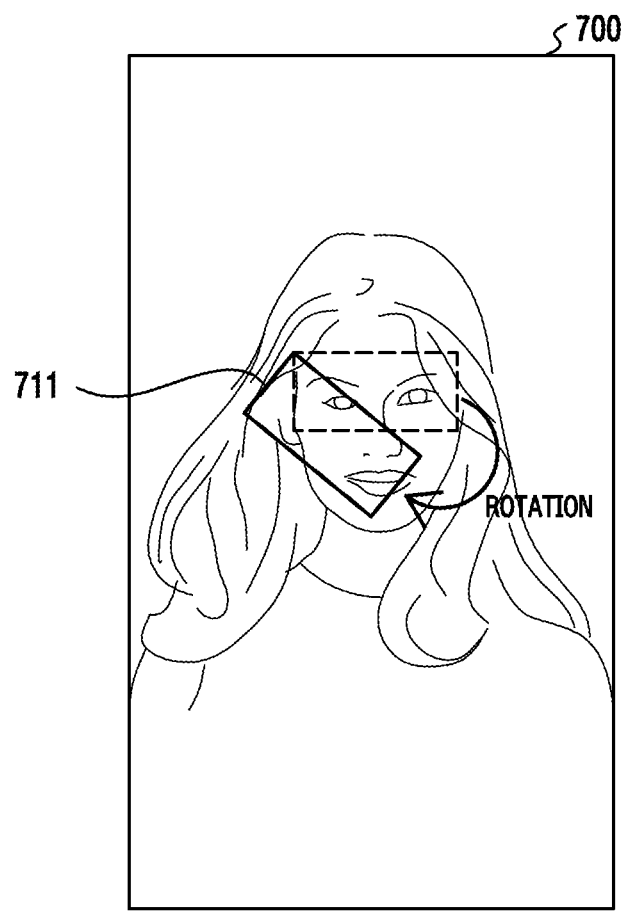
Figure 7C:
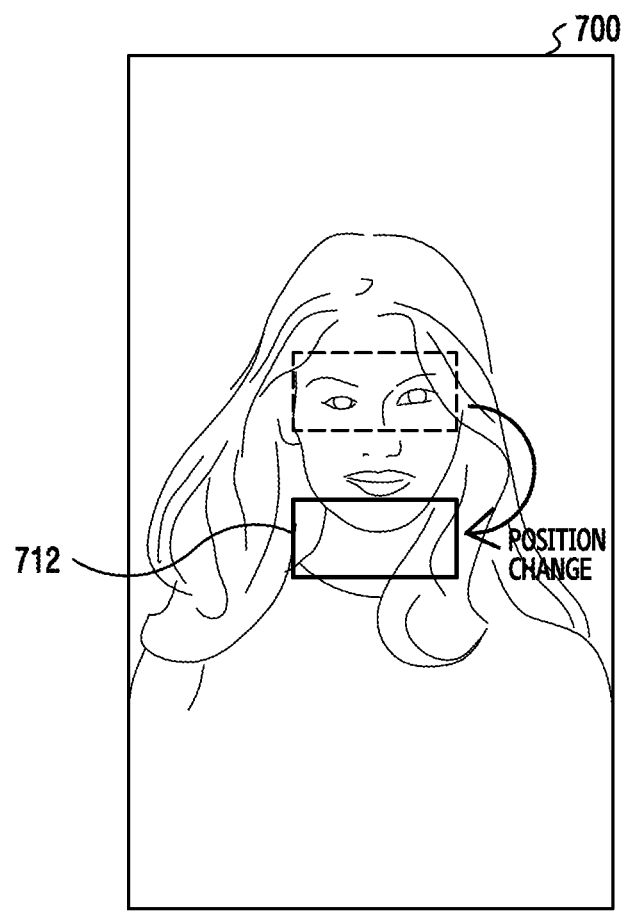
Figure 7D:
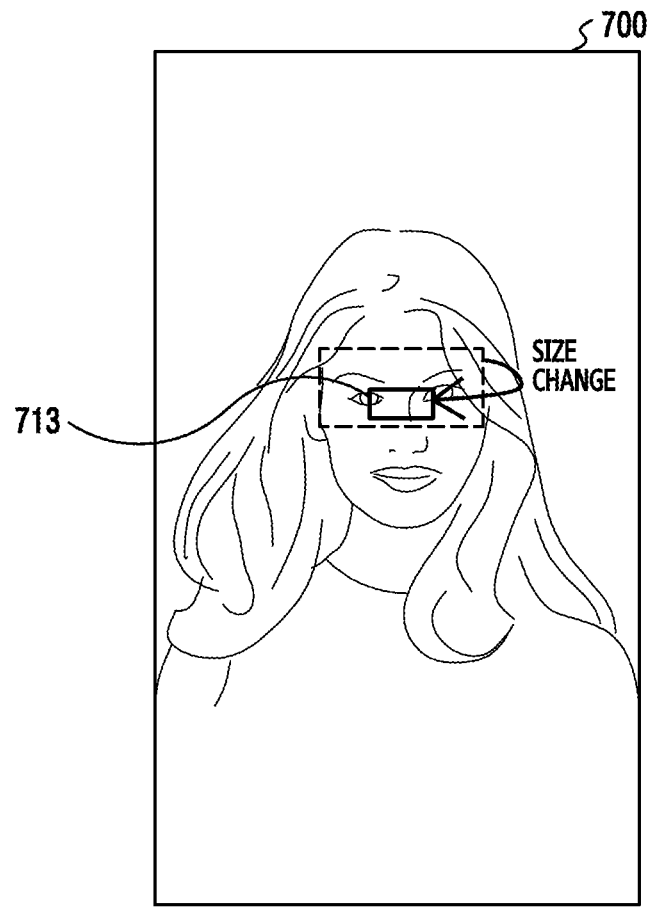

In a case in which the biometric information obtainment is possible, at operation 605, the electronic device changes the variable indicating the state of the reference area. For example, in a case in which the biometric information obtainment is possible, the electronic device may determine that the unintended user authentication may be performed, and may change the position, the angle, and/or the size of the reference area in order to prevent the performance of the unintended user authentication. As an example, referring to FIG. 7A, in a case in which a reference area 710 is set in advance as an area where iris information of a user may be obtained from a captured image 700, as illustrated in FIG. 7B, the electronic device may rotate a reference area 711 by a predetermined angle or a random angle. As another example, as illustrated in FIG. 7A, in a case in which the reference area 710 is set in advance as the area where the iris information of the user may be obtained from the captured image 700, as illustrated in FIG. 7C, the electronic device may change a position of a reference area 712 from a predetermined position to another position. The electronic device may move the position of the reference area 712 from a predetermined position to another random position, or may move the position of the reference area 712 from a predetermined position in a predetermined direction by a predetermined distance. As further another example, as illustrated in FIG. 7A, in a case in which the reference area 710 is set in advance as the area where the iris information of the user may be obtained from the captured image 700, as illustrated in FIG. 7D, the electronic device may change a size of a reference area 713 from a predetermined size to another size. The electronic device may change the size of the reference area 713 according to a predetermined magnification or a random magnification.

Figure 8:
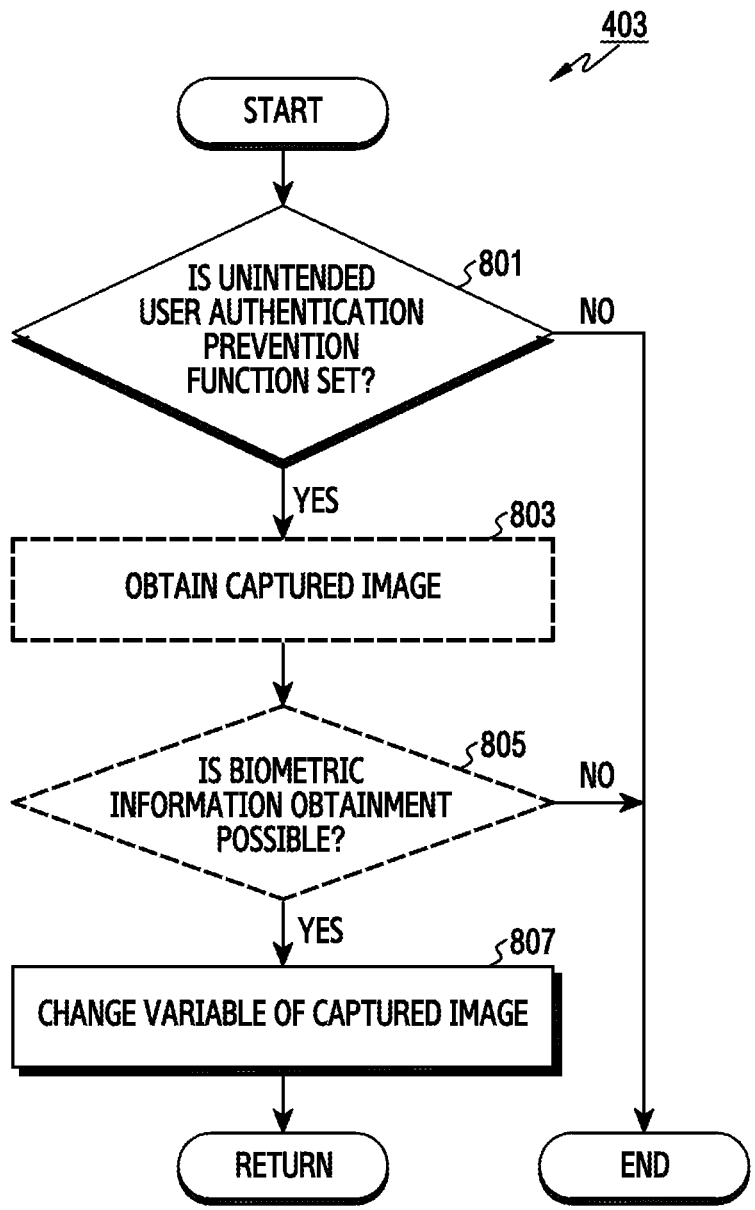
FIG. 8 illustrates a flowchart for changing a variable of the captured image in the electronic device according to various embodiments of the disclosure.

FIG. 8 illustrates a flowchart for changing the variable of the captured image in the electronic device according to various embodiments of the disclosure. FIGS. 9A, 9B, 9C, and 9D illustrate an obtained captured image and a changed captured image in the electronic device according to various embodiments of the disclosure. Hereinafter, an operation of changing the biometric information recognition variable by the electronic device at operation 403 of FIG. 4 is described in detail. In the following embodiment, each of operations may be sequentially performed, but is not limited thereto. For example, a sequence of each of the operations may be changed, and two or more operations may be performed in parallel. The electronic device may be the electronic device 101 of FIG. 1. An operation of a block shown as a dotted line in FIG. 8 may be omitted according to an embodiment.

Referring to FIG. 8, at operation 801, the electronic device examines whether a setting is made so as to perform the unintended user authentication prevention function. The unintended user authentication prevention function may refer to a function for preventing an operation corresponding to the user authentication success, by preventing a successful performance of the user authentication using the biometric information recognition at a time point when a user does not intend to perform the user authentication. The performance or not of the unintended user authentication prevention function may be set by the user input. In a case in which a setting is made so as not to perform the unintended user authentication prevention function, the electronic device ends procedures according to various embodiments.

In a case in which a setting is made so as to perform the unintended user authentication prevention function, at operation 803, the electronic device obtains the captured image from the camera 180. The electronic device may drive the camera 180, and may obtain at least one captured image from the driven camera 180.

At operation 805, the electronic device examines whether the biometric information obtainment is possible. For example, the electronic device examines whether the biometric information obtainment is possible, using a predetermined reference area and the captured image received from the camera 180. For example, the electronic device examines whether the biometric information for the user authentication is present in an area of the captured image corresponding to the reference area. In a case in which the biometric information for the user authentication is present in the area of the captured image corresponding to the reference area, the electronic device may determine that the biometric information obtainment is possible, and in a case in which the biometric information for the user authentication is not present in the area of the captured image corresponding to the reference area, the electronic device may determine that the biometric information obtainment is impossible. In a case in which the biometric information obtainment is impossible, the electronic device ends procedures according to various embodiments. For example, in a case in which the biometric information obtainment is impossible, the electronic device determines that the unintended user authentication is not performed, and ends procedures according to various embodiments.

In a case in which the biometric information obtainment is possible, at operation 807, the electronic device changes the variable indicating the state of the captured image. For example, in a case in which the biometric information obtainment is possible, the electronic device may determine that the unintended user authentication may be performed, and may change the position, the angle, and/or the size of the captured image in order to prevent the performance of the unintended user authentication.

Figure 9A:
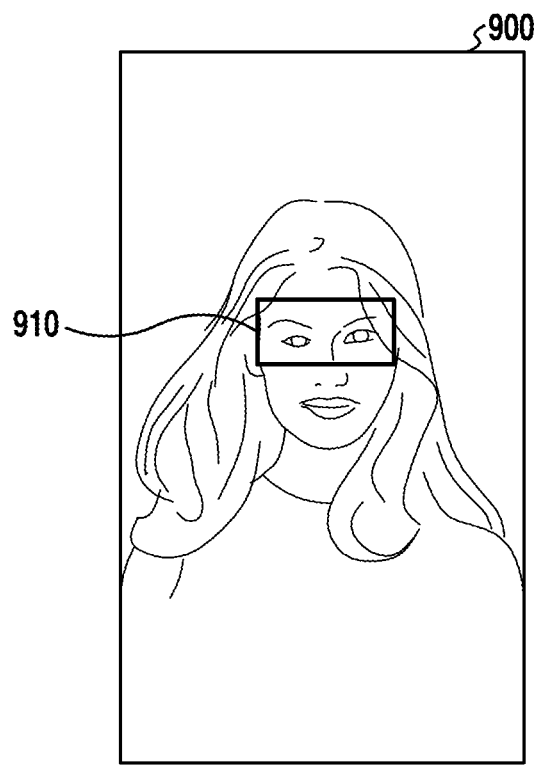
FIGS. 9A, 9B, 9C, and 9D illustrate an obtained captured image and a changed captured image in the electronic device according to various embodiments of the disclosure.
Figure 9B:
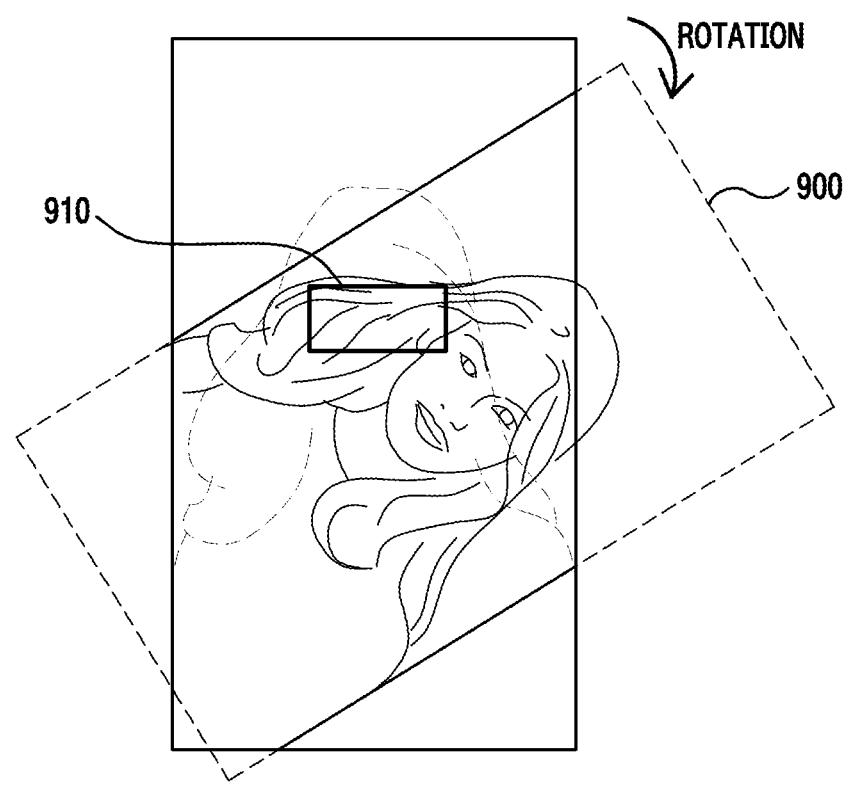
Figure 9C:
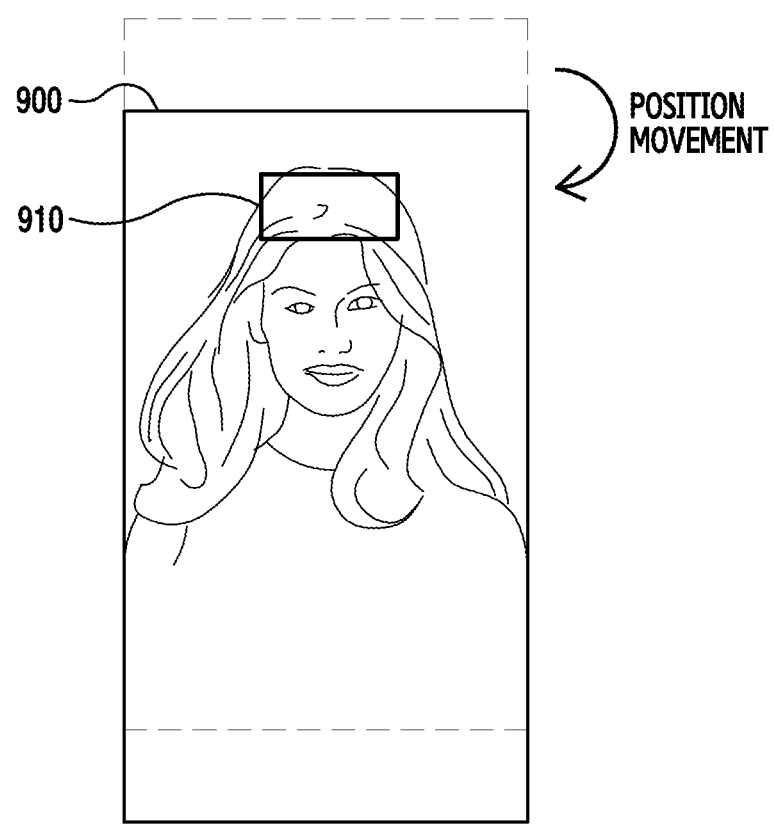
Figure 9D:
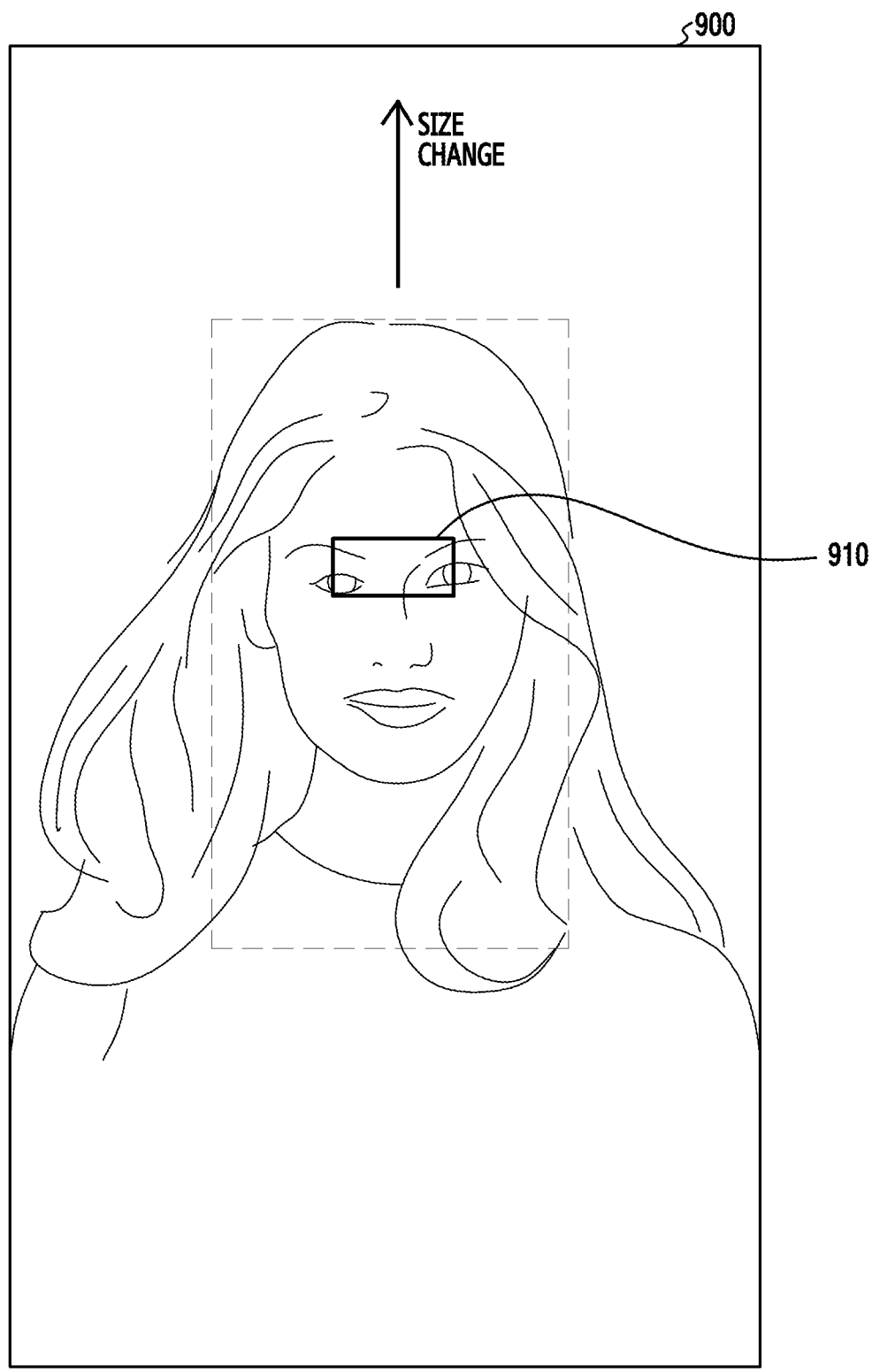

As an example, referring to FIG. 9A, in a case in which a reference area 910 is set in advance as an area where iris information of a user may be obtained from a captured image 900, as illustrated in FIG. 9B, the electronic device may rotate the captured image 900 by a predetermined angle or a random angle. As another example, as illustrated in FIG. 9A, in a case in which the reference area 910 is set in advance as the area where the iris information of the user may be obtained from the captured image 900, as illustrated in FIG. 9C, the electronic device may change a position of the captured image 900 from a predetermined position to another position. The electronic device may move the position of the captured image 900 from a predetermined position to another random position, or may move the position of the captured image 900 from a predetermined position in a predetermined direction by a predetermined distance. As further another example, as illustrated in FIG. 9A, in a case in which the reference area 910 is set in advance as the area where the iris information of the user may be obtained from the captured image 900, as illustrated in FIG. 9D, the electronic device may change a size of the captured image 900 from a predetermined size to another size. The electronic device may change the size of the captured image 900 according to a predetermined magnification or a random magnification.

Figure 10:
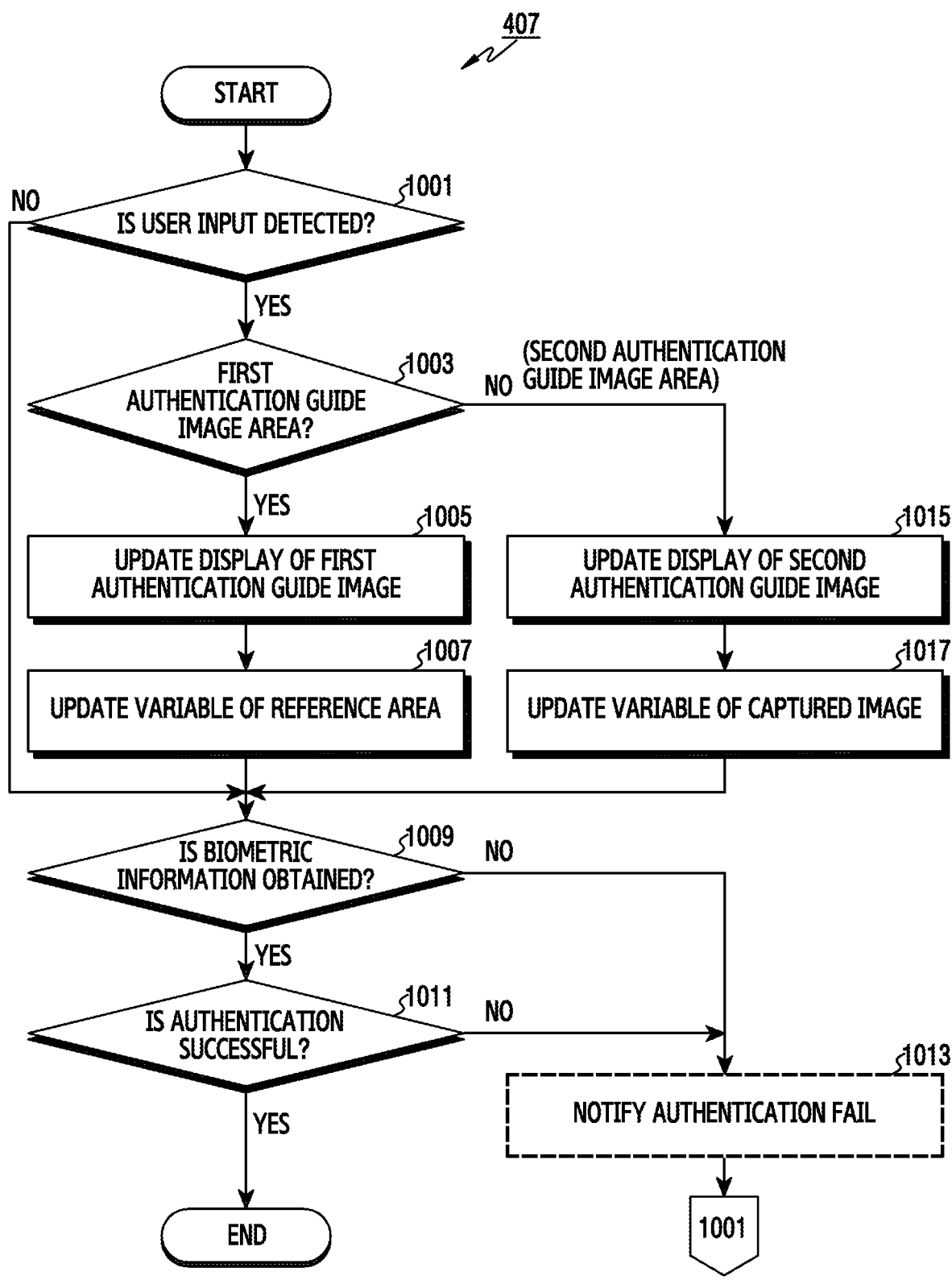
FIG. 10 illustrates a flowchart for performing the user authentication by obtaining biometric information in the electronic device according to various embodiments of the disclosure.

FIG. 10 illustrates a flowchart for performing the user authentication by obtaining the biometric information in the electronic device according to various embodiments of the disclosure. FIGS. 11A, 11B, 11C, and 11D illustrate a screen configuration and a concept diagram for performing the user authentication by controlling the authentication guide image for the reference area in the electronic device according to various embodiments of the disclosure. FIGS. 12A, 12B, 12C, and 12D illustrate a screen configuration and a concept diagram for performing the user authentication by controlling the authentication guide image for the captured image in the electronic device according to various embodiments of the disclosure. Hereinafter, an operation of performing the user authentication by the electronic device at operation 407 of FIG. 4 is described in detail. In the following embodiment, each of operations may be sequentially performed, but is not limited thereto. For example, a sequence of each of the operations may be changed, and two or more operations may be performed in parallel. The electronic device may be the electronic device 101 of FIG. 1. An operation of a block shown as a dotted line in FIG. 10 may be omitted according to an embodiment.

Referring to FIG. 10, at operation 1001, the electronic device determines whether the user input is detected. For example, the electronic device may determine whether the user input (e.g., a touch input) is detected in a state in which the screen demanding the user authentication is displayed. The screen demanding the user authentication may include the first authentication guide image and the second authentication guide image which guide the change of the biometric information recognition related variable.

At operation 1003, the electronic device determines whether an area where the user input is detected is an area where the first authentication guide image is displayed. For example, the electronic device may determine whether the user input is detected in the area where the first authentication guide image is displayed or the user input is detected in the area where the second authentication guide image is displayed, in the screen demanding the user authentication.

In a case in which the area where the user input is detected is the area where the first authentication guide image is displayed, at operation 1005, the electronic device updates, based on the user input, the display of the first authentication guide image.

Figure 11A:
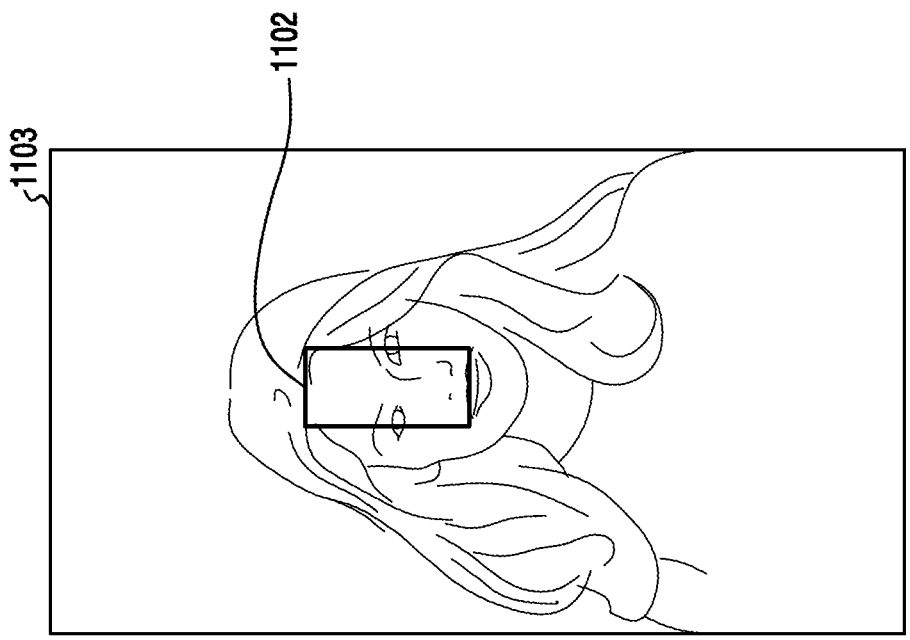
Figure 11A:
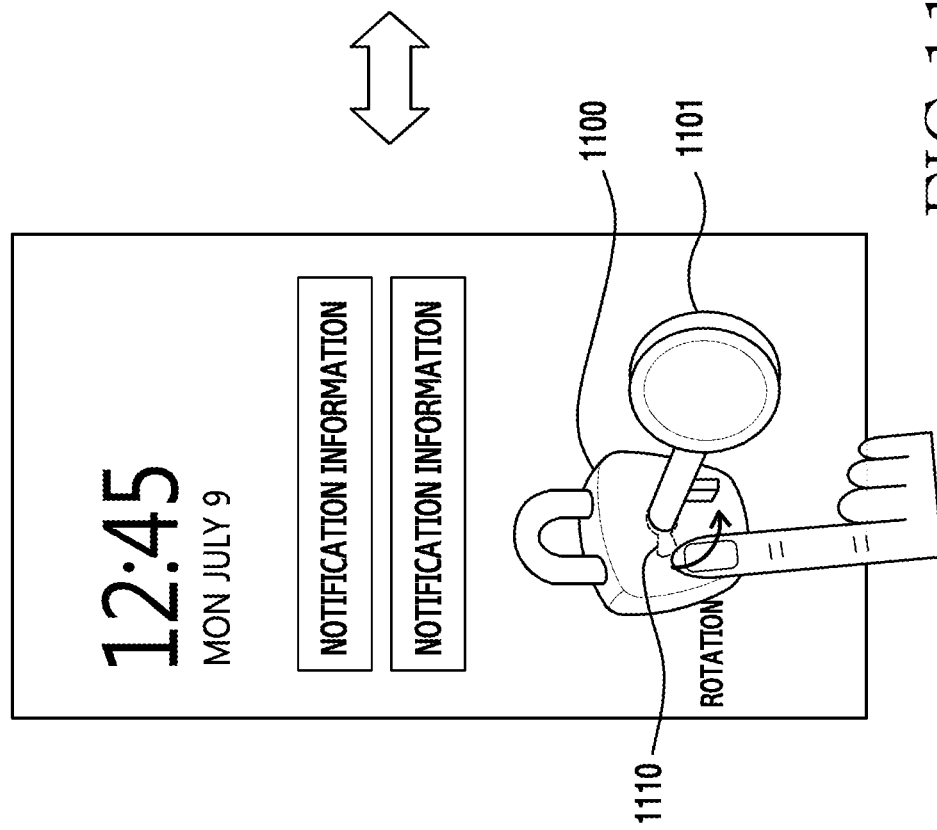
Figure 11B:
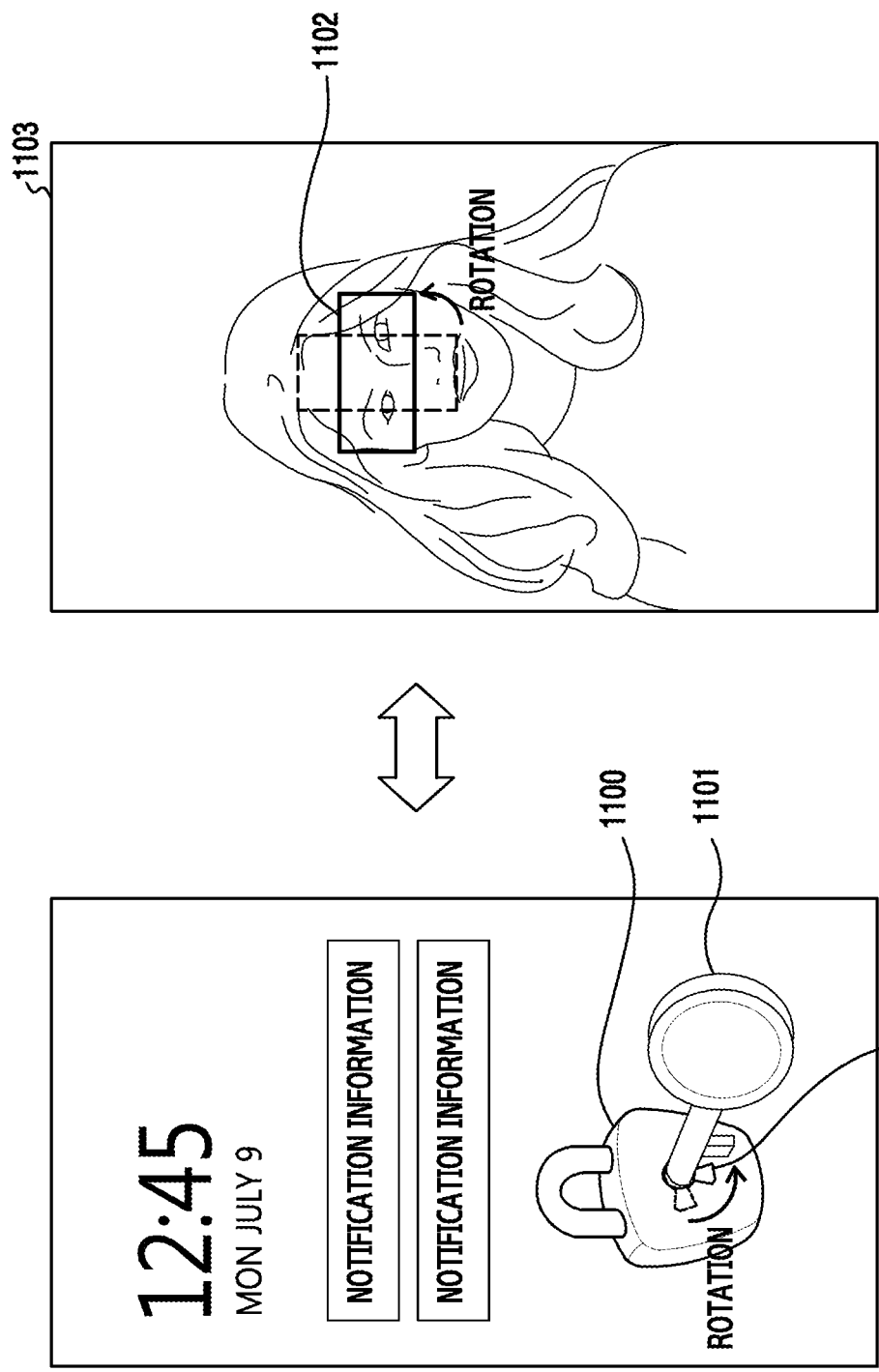
Figure 11D:
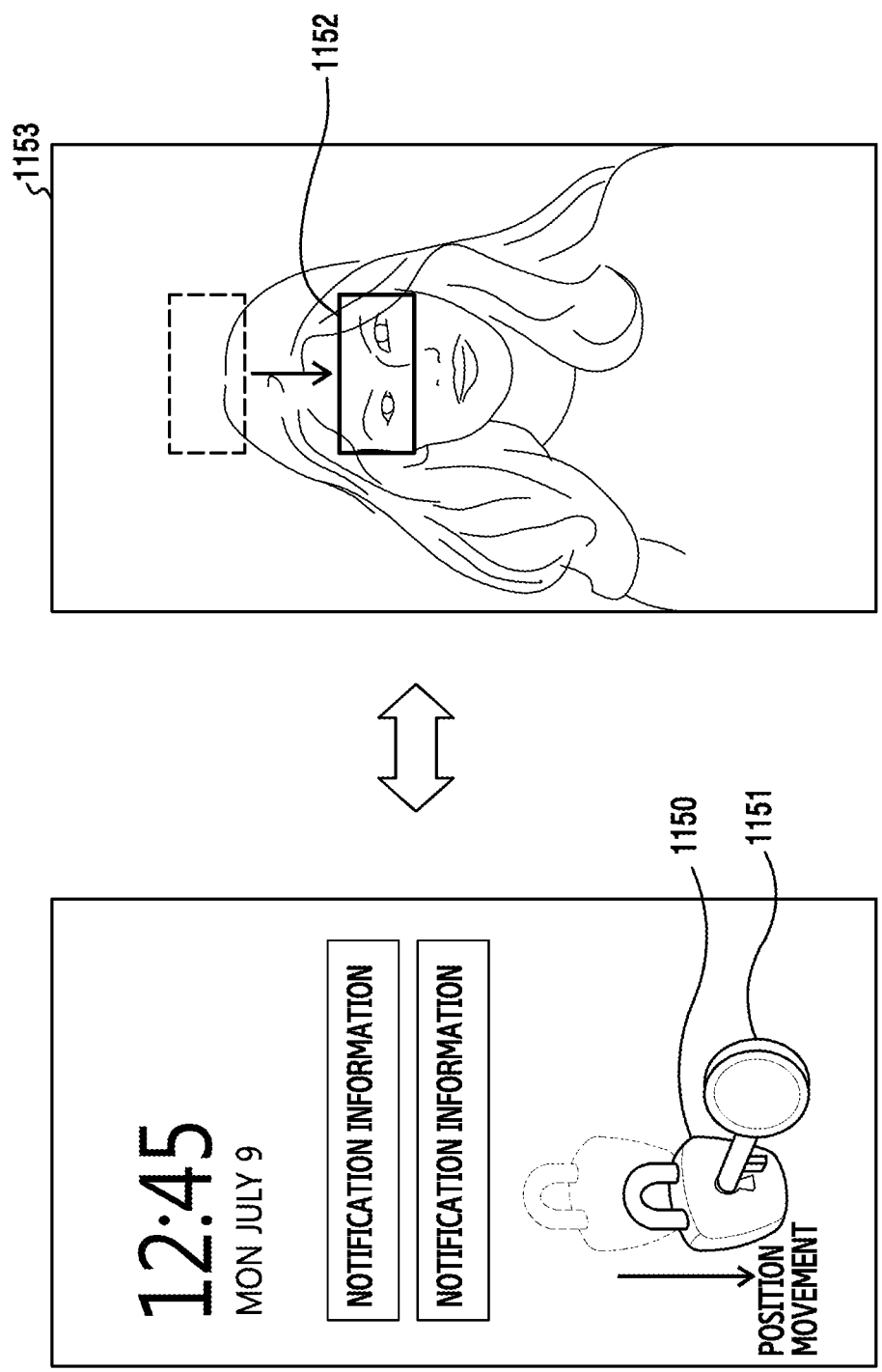

As an example, referring to FIG. 11A, in a case in which a touch for a lock image 1100 which is the first authentication guide image is detected and then a drag of a curve shape is detected, as illustrated in FIG. 11B, the electronic device may rotate at least some 1110 (e.g., a groove portion matched with a key image 1101) of the lock image 1100 according to the drag of the curve shape and display the lock image 1100. As another example, as illustrated in FIG. 11C, in a case in which a touch for a lock image 1150 which is the first authentication guide image is detected and then a drag is detected in a downward direction, as illustrated in FIG. 11D, the electronic device may move the lock image 1150 according to the drag of the downward direction and display the lock image 1150. Since a touch for a key image 1101 which is the second authentication guide image is not detected, as illustrated in FIGS. 11A to 11D, the electronic device may not update a display of key images 1101 and 1151 and maintain the display as it is.

At operation 1007, the electronic device updates, based on the user input, the variable of the reference area. For example, since the user input is detected for the first authentication guide image corresponding to the reference area, the electronic device may update the position, the angle, and/or the size of the reference area according to the user input. As a specific example, as illustrated in FIG. 11A, in a state in which a reference area 1102 is matched with the lock image 1100 and a captured image 1103 is matched with the key image 1101, in a case in which the user input for rotating the at least some 1110 of the lock image 1100 is detected, as illustrated in FIG. 11B, the electronic device may change the angle of the reference area 1102 by rotating the reference area. The electronic device may change, based on the rotation angle of the lock image 1100, the angle of the reference area 1102. As another example, as illustrated in FIG. 11C, in a state in which a reference area 1152 is matched with the lock image 1150 and a captured image 1153 is matched with the key image 1151, in a case in which a user input for moving the position of the lock image 1150 is detected, as illustrated in FIG. 11D, the electronic device may change a position of the reference area 1152. The electronic device may change, based on a moved distance of the lock image 1150, the position of the reference area 1152 from a predetermined position to another position.

At operation 1009, the electronic device determines whether the biometric information obtainment is possible. For example, the electronic device examines whether the biometric information obtainment is possible, using the reference area of which the variable is updated and the captured image received from the camera 180. For example, the electronic device examines whether the biometric information for the user authentication is present in an area of the captured image corresponding to the reference area. In a case in which the biometric information for the user authentication is present in the area of the captured image corresponding to the reference area, the electronic device may determine that the biometric information obtainment is possible, and in a case in which the biometric information for the user authentication is not present in the area of the captured image corresponding to the reference area, the electronic device may determine that the biometric information obtainment is impossible.

In a case in which the biometric information obtainment is impossible, at operation 1013, the electronic device may notify the authentication failure to a user. For example, in a case in which the biometric information obtainment is impossible, the electronic device may output, to the user, a message or a graphic image indicating the biometric information obtainment failure, discrepancy between the lock images 1100 and 1150 and the key images 1101 and 1151, and/or discrepancy between the reference areas 1102 and 1152 and the captured images 1103 and 1153. In a case in which the biometric information obtainment is possible, at operation 1011, the electronic device performs the user authentication using the biometric information and determines whether the user authentication is successful. For example, the electronic device may obtain the biometric information using the reference area of which the variable is updated and the captured image received from the camera 180, and may determine whether the user authentication is successful by comparing the obtained biometric information with previously stored biometric information.

At operation 1011, as a result of the determination whether the user authentication is successful, in a case in which it is determined that the user authentication fails, at operation 1013, the electronic device may notify the authentication fail to a user. For example, the electronic device may output a message or a graphic image indicating the failure of the user authentication due to discrepancy of the biometric information. At operation 1011, as a result of the determination whether the user authentication is successful, in a case in which it is determined that the user authentication is successful, the electronic device may perform an operation (e.g., a lock screen release and a payment function performance) corresponding to the user authentication success, and may end procedures according to an embodiment.

Figure 12A:
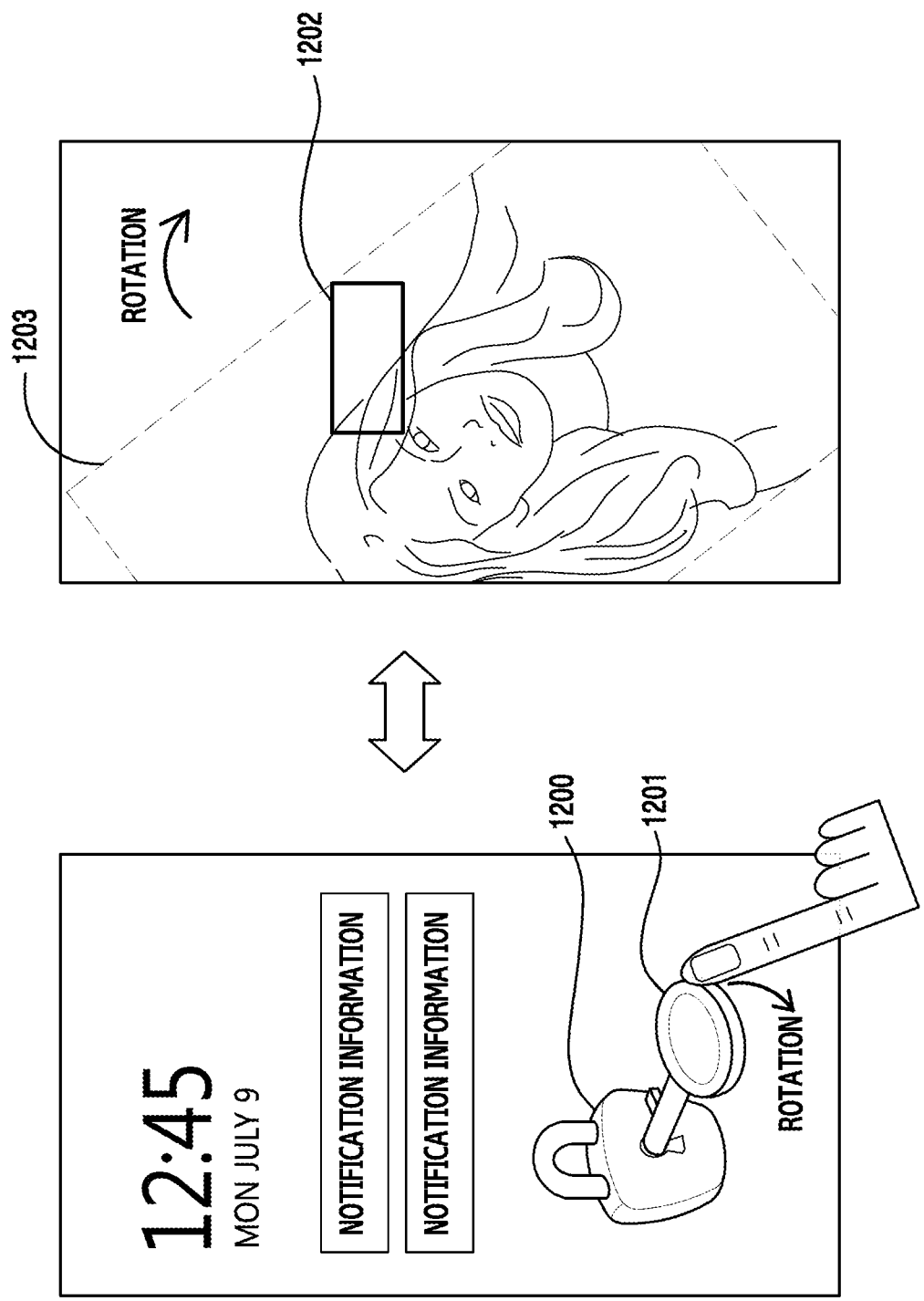
Figure 12B:
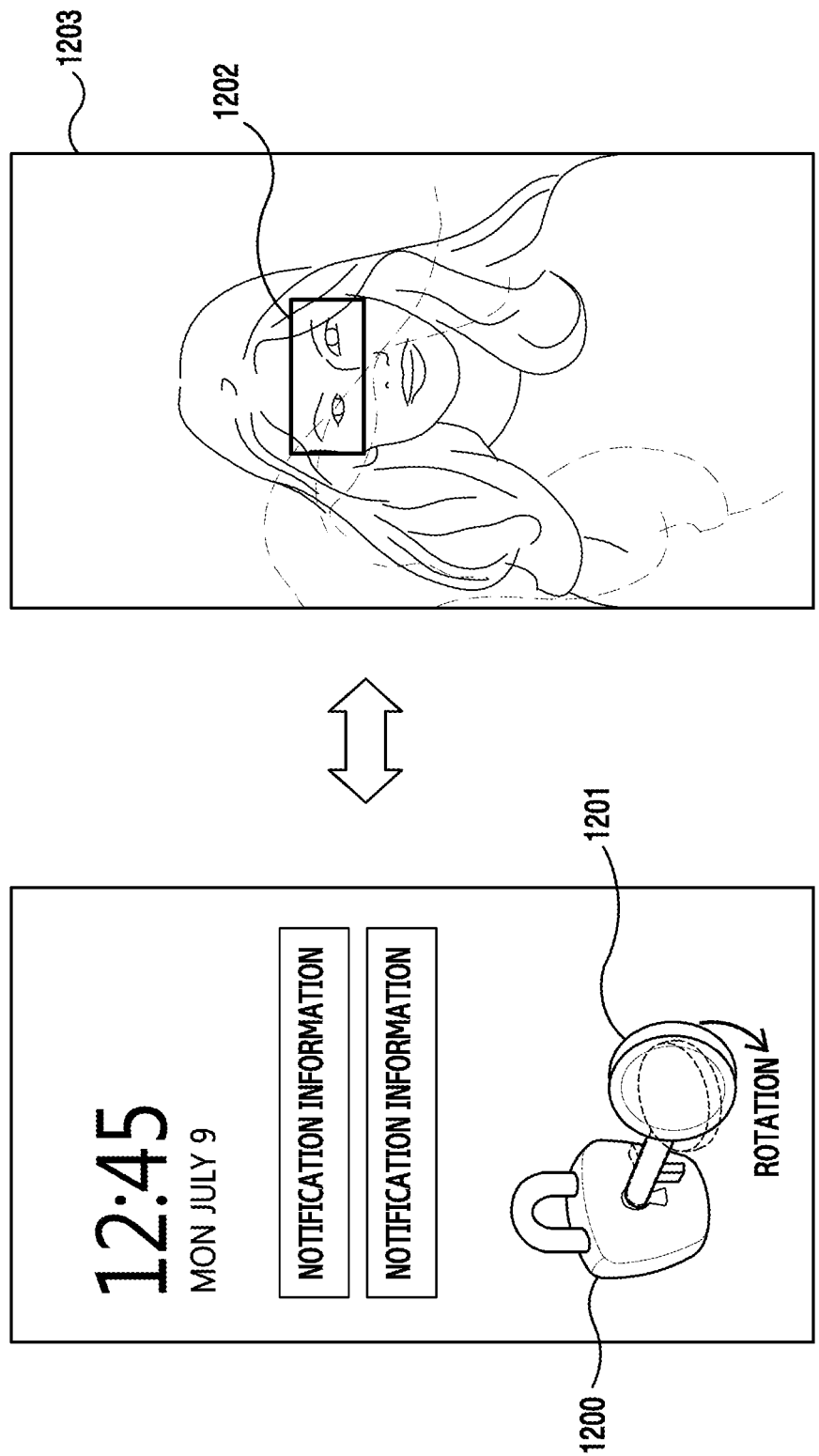
Figure 12D:
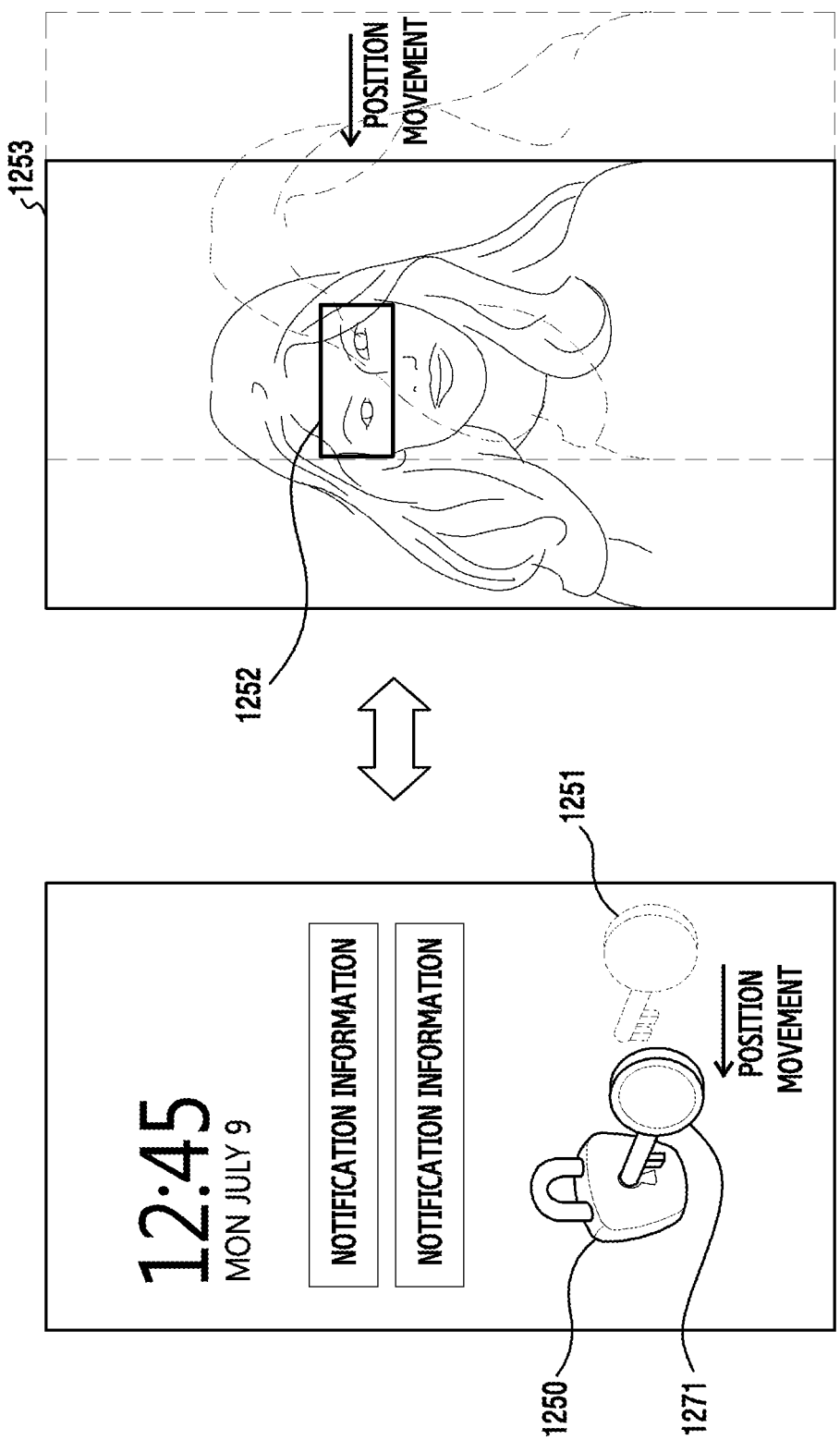

At operation 1003, In a case in which the area where the user input is detected is the area where the second authentication guide image is displayed, at operation 1015, the electronic device updates, based on the user input, the display of the second authentication guide image. For example, referring to FIG. 12A, in a case in which a touch for a key image 1201 which is the second authentication guide image is detected and then a drag of a curve shape is detected, as illustrated in FIG. 12B, the electronic device may rotate the key image 1201 according to the drag of the curve shape and display the key image 1201. As another example, as illustrated in FIG. 12C, in a case in which a touch for a key image 1251 which is the second authentication guide image is detected and then a drag is detected in a left direction, as illustrated in FIG. 12D, the electronic device may move the key image 1251 according to the drag of the left direction and display the key image 1271. Since a touch for lock images 1200 and 1250 which are the second authentication guide image is not detected, as illustrated in FIGS. 12A to 12D, the electronic device may not update a display of lock images 1200 and 1250 and maintain the display as it is.

At operation 1017, the electronic device updates, based on the user input, the variable of the captured image. For example, since the user input is detected for the second authentication guide image corresponding to the captured image, the electronic device may update the position, the angle, and/or the size of the captured image according to the user input. As a specific example, as illustrated in FIG. 12A, in a state in which a reference area 1202 is matched with the lock image 1200 and a captured image 1203 is matched with the key image 1201, in a case in which the user input for rotating the key image 1201 is detected, as illustrated in FIG. 12B, the electronic device may change the angle of the captured image 1203 by rotating the captured image. The electronic device may change, based on the rotation angle of the key image 1201, the angle of the captured image 1203. As another example, as illustrated in FIG. 12C, in a state in which a reference area 1252 is matched with the lock image 1250 and a captured image 1253 is matched with the key image 1251, in a case in which a user input for moving the position of the key image 1251 in a left direction is detected, as illustrated in FIG. 12D, the electronic device may change a position of the captured image 1253. The electronic device may change, based on a moved distance of the key image 1251, the position of the captured image 1253 from a predetermined position to another position.

At operation 1009, the electronic device determines whether the biometric information obtainment is possible. For example, the electronic device examines whether the biometric information obtainment is possible, using a predetermined reference area and a captured image of which the variable is updated. For example, the electronic device examines whether the biometric information for the user authentication is present in an area of the captured image corresponding to the reference area. In a case in which the biometric information for the user authentication is present in the area of the captured image corresponding to the reference area, the electronic device may determine that the biometric information obtainment is possible, and in a case in which the biometric information for the user authentication is not present in the area of the captured image corresponding to the reference area, the electronic device may determine that the biometric information obtainment is impossible.

In a case in which the biometric information obtainment is impossible, at operation 1013, the electronic device may notify the authentication failure to a user. For example, in a case in which the biometric information obtainment is impossible, the electronic device may output, to the user, a message or a graphic image indicating the biometric information obtainment failure, discrepancy between the lock images 1200 and 1250 and the key images 1201 and 1251, and/or discrepancy between the reference areas 1202 and 1252 and the captured images 1203 and 1253. In a case in which the biometric information obtainment is possible, at operation 1011, the electronic device performs the user authentication using the biometric information and determines whether the user authentication is successful. For example, the electronic device may obtain the biometric information using the predetermined reference area and the captured image of which the variable is changed, and may determine whether the user authentication is successful by comparing the obtained biometric information with previously stored biometric information.

At operation 1011, as a result of the determination whether the user authentication is successful, in a case in which it is determined that the user authentication fails, at operation 1013, the electronic device may notify the authentication fail to a user. For example, the electronic device may output a message or a graphic image indicating the failure of the user authentication due to discrepancy of the biometric information. At operation 1011, as a result of the determination whether the user authentication is successful, in a case in which it is determined that the user authentication is successful, the electronic device may perform an operation (e.g., a lock screen release and a payment function performance) corresponding to the user authentication success, and may end procedures according to an embodiment.

Figure 13:
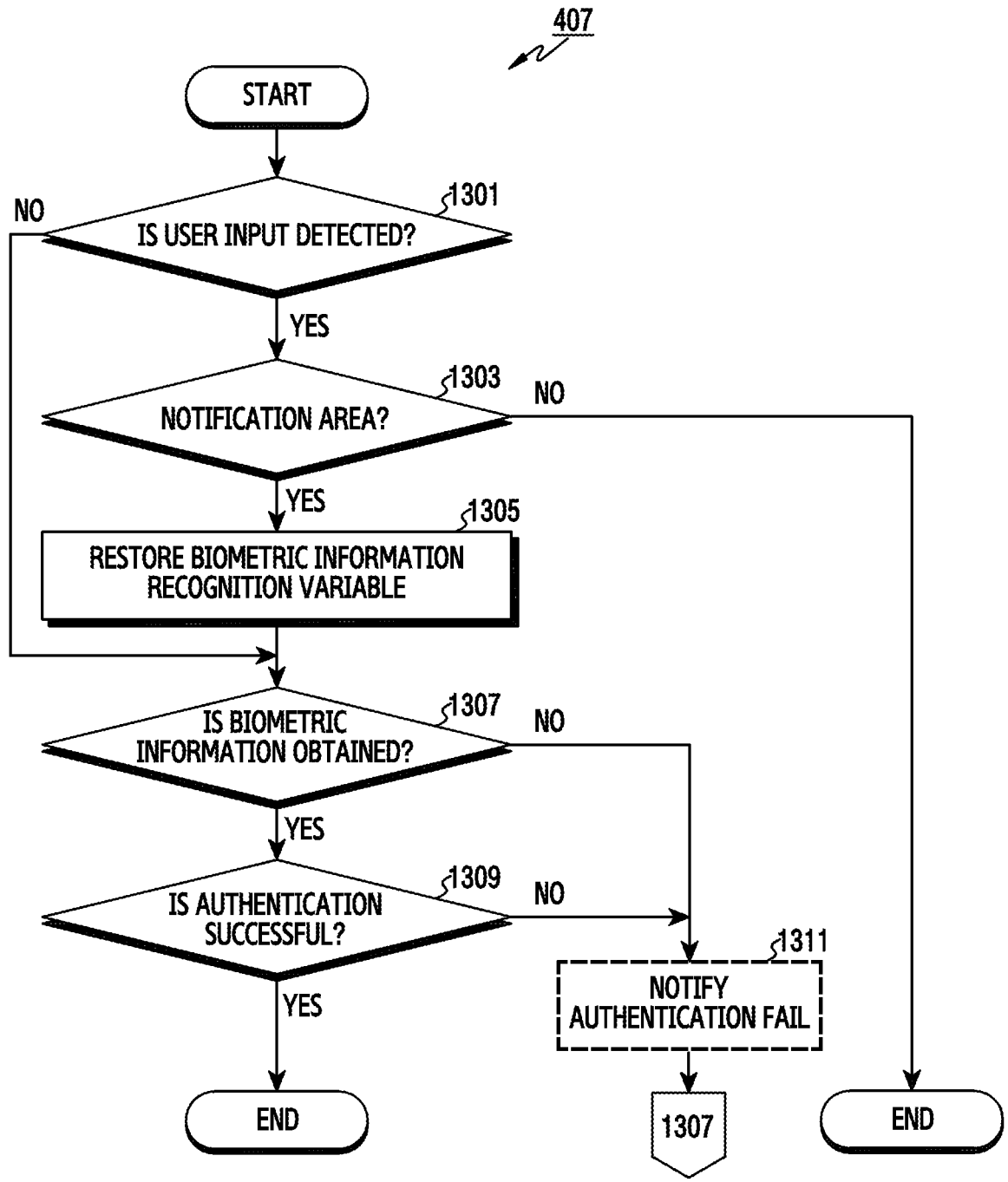
FIG. 13 illustrates a flowchart for performing the user authentication by sensing a touch for a notification area in the electronic device according to various embodiments of the disclosure.

FIG. 13 illustrates a flowchart for performing the user authentication by detecting a touch for a notification area in the electronic device according to various embodiments of the disclosure. FIGS. 14A, 14B, 14C, and 14D illustrate a screen configuration and a concept diagram for performing the user authentication by sensing the touch for the notification area in the electronic device according to various embodiments of the disclosure. Hereinafter, an operation of performing the user authentication by the electronic device at operation 407 of FIG. 4 is described in detail. In the following embodiment, each of operations may be sequentially performed, but is not limited thereto. For example, a sequence of each of the operations may be changed, and two or more operations may be performed in parallel. The electronic device may be the electronic device 101 of FIG. 1. An operation of a block shown as a dotted line in FIG. 13 may be omitted according to an embodiment.

Referring to FIG. 13, at operation 1301, the electronic device determines whether the user input is detected. For example, the electronic device may determine whether the user input (e.g., a touch input) is detected in a state in which the screen demanding the user authentication is displayed. The screen demanding the user authentication may include notification information related to a corresponding application. For example, the user authentication demand screen of the application providing the lock function may include information on a lock state, and notification information on an event (e.g., presence or not of an unchecked received message, presence or not of an unchecked call during one's absence, presence or not of an unchecked application notification, and the like) generated in the electronic device. As another example, the user authentication demand screen of the application providing the payment function may include information on a payment activation demand and information (e.g., payment card information, payment account information, and the like) on a payment method.

At operation 1303, the electronic device determines whether an area where the user input is detected is an area where the notification information is displayed. For example, the electronic device may determine whether the user input is an input for displaying the notification information in detail. In a case in which the area where the user input is detected is not the area where the notification information is displayed, the electronic device may end procedures according to various embodiments.

Figure 14A:
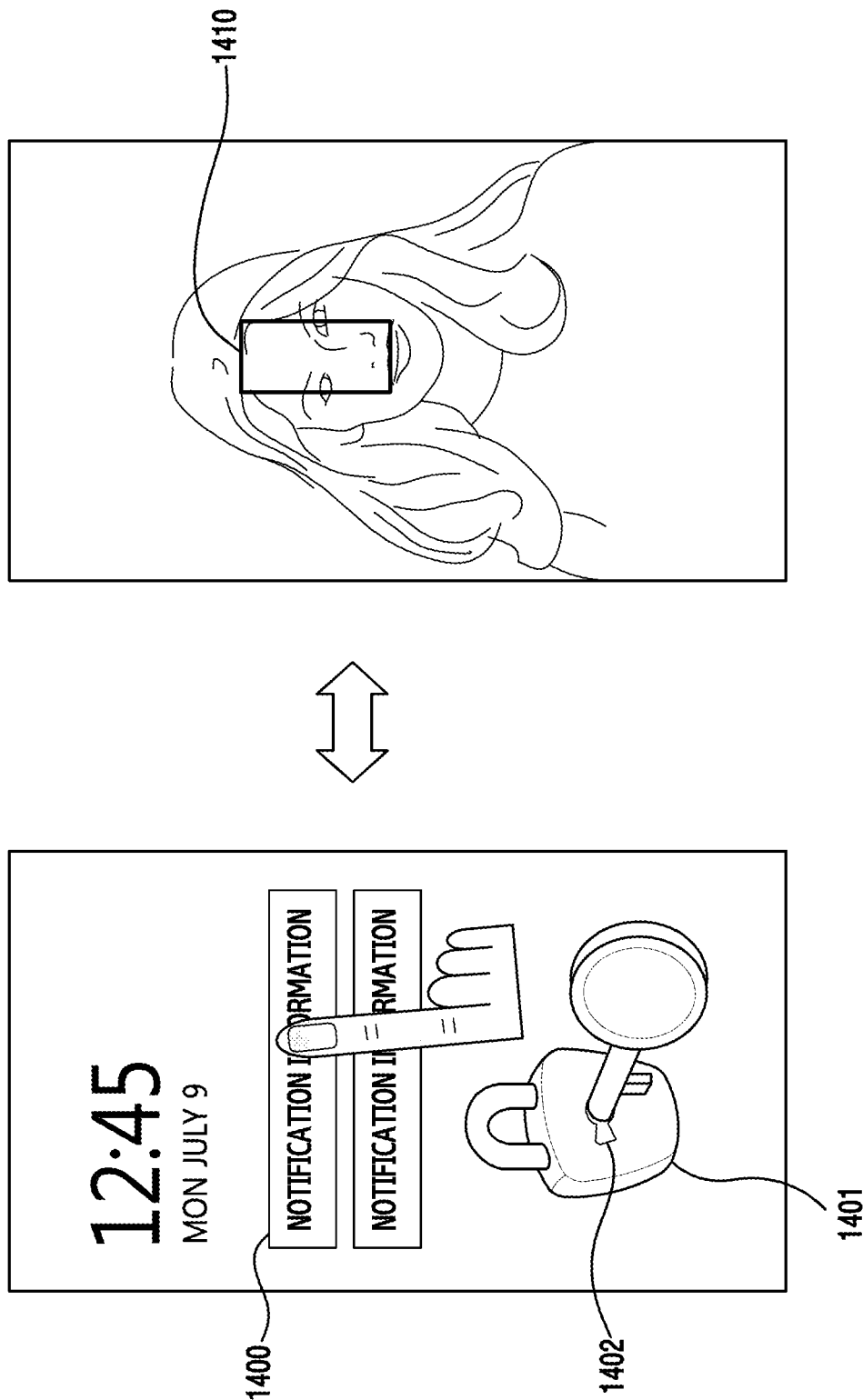
FIGS. 14A, 14B, 14C, and 14D illustrate a screen configuration and a concept diagram for performing the user authentication by sensing the touch for the notification area in the electronic device according to various embodiments of the disclosure.
Figure 14B:
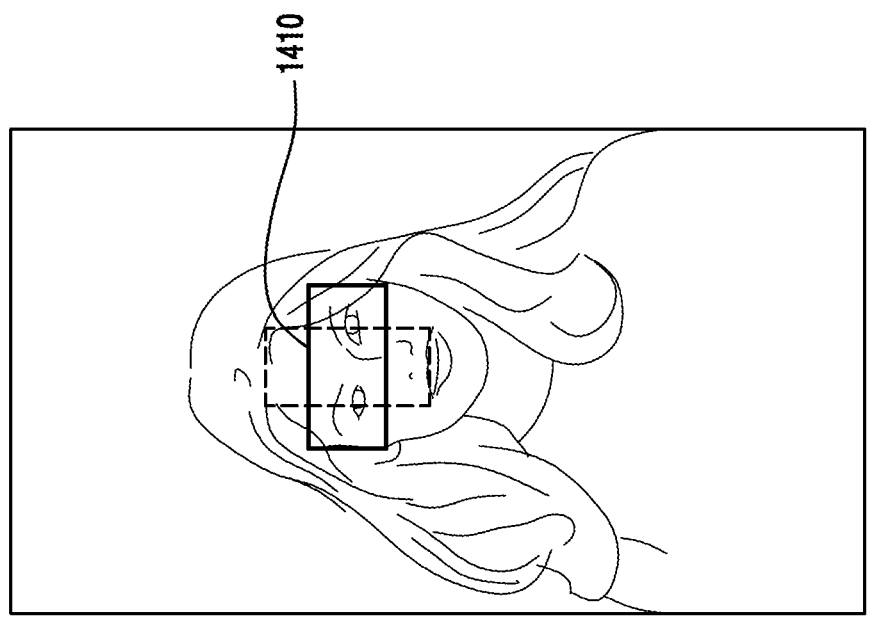
Figure 14B:
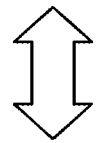
Figure 14B:
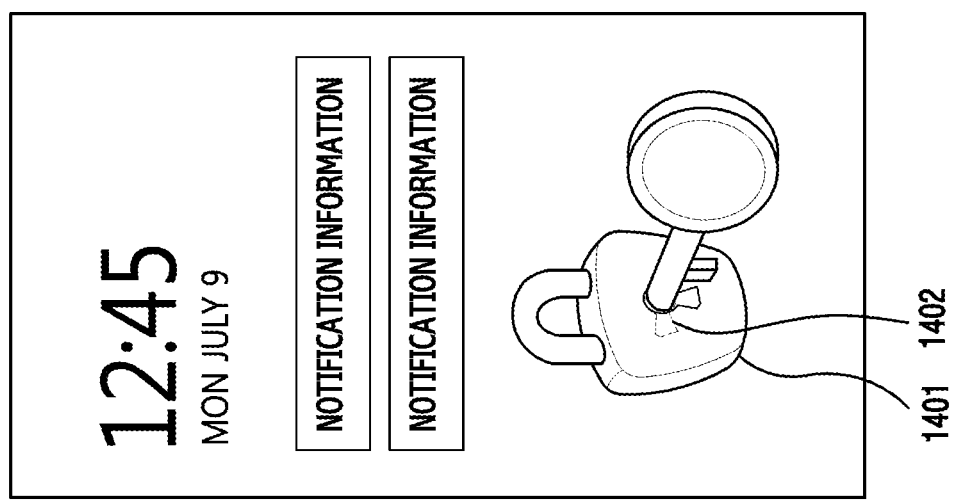

In a case in which the area where the user input is detected is the area where the notification information is displayed, at operation 1305, the electronic device restores the biometric information recognition related variable. For example, in a case in which a user input for displaying the notification information in detail is detected, the electronic device may restore the biometric information recognition variable which is changed at operation 403 of FIG. 4 into a predetermined original value. For example, in a case in which the notification information is selected by a user, the electronic device may determine that the user desires to perform the user authentication to see corresponding notification information in detail, and may restore the variable indicating the state of the reference area or the captured image into the original value in order to perform the user authentication. For example, as illustrated in FIG. 14A, in a case in which a user input for notification information 1400 is detected in a state in which an angle of a reference area 1410 is rotated by 90 degrees, as illustrated in FIG. 14B, the electronic device may restore the angle of the reference area 1410 into an original value. According to an embodiment, as illustrated in FIG. 14B, the electronic device may change an angle of at least some 1402 of a lock image 1401 so that the angle of the at least some 1402 of the lock image 1401 correspond to the restored angle of the reference area 1410 and may display the lock image 1401 while restoring the angle of the reference area 1410 into the original value.

Figure 14C:
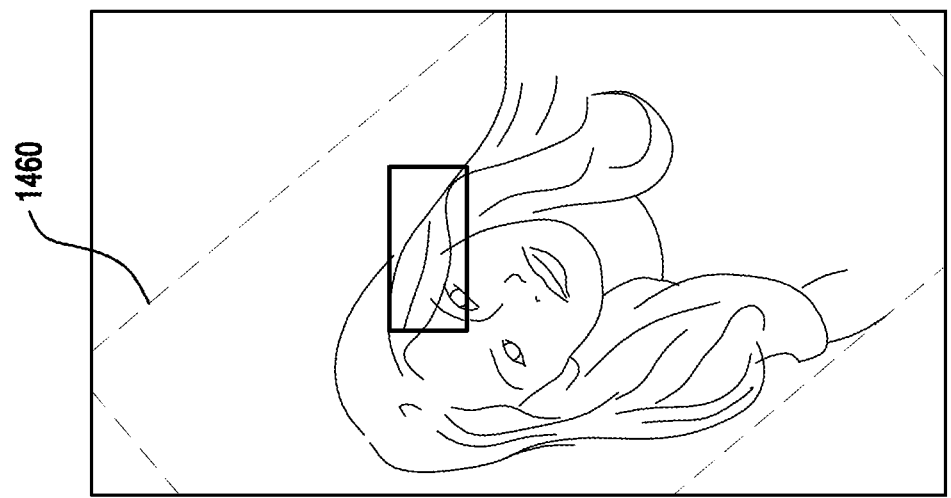
Figure 14C:
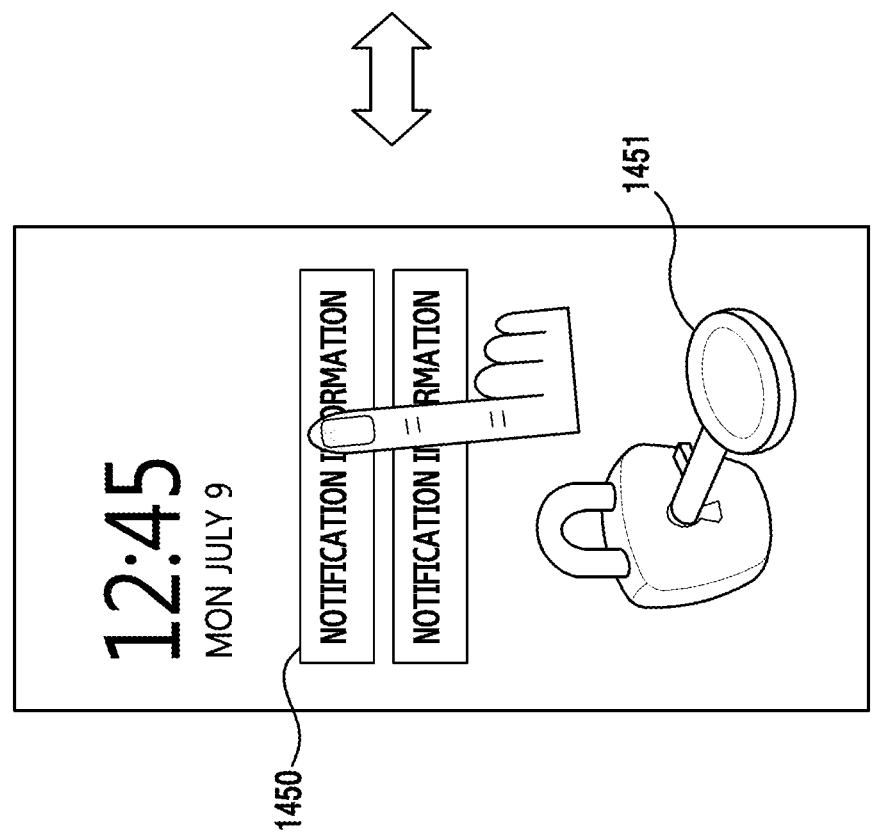
Figure 14D:
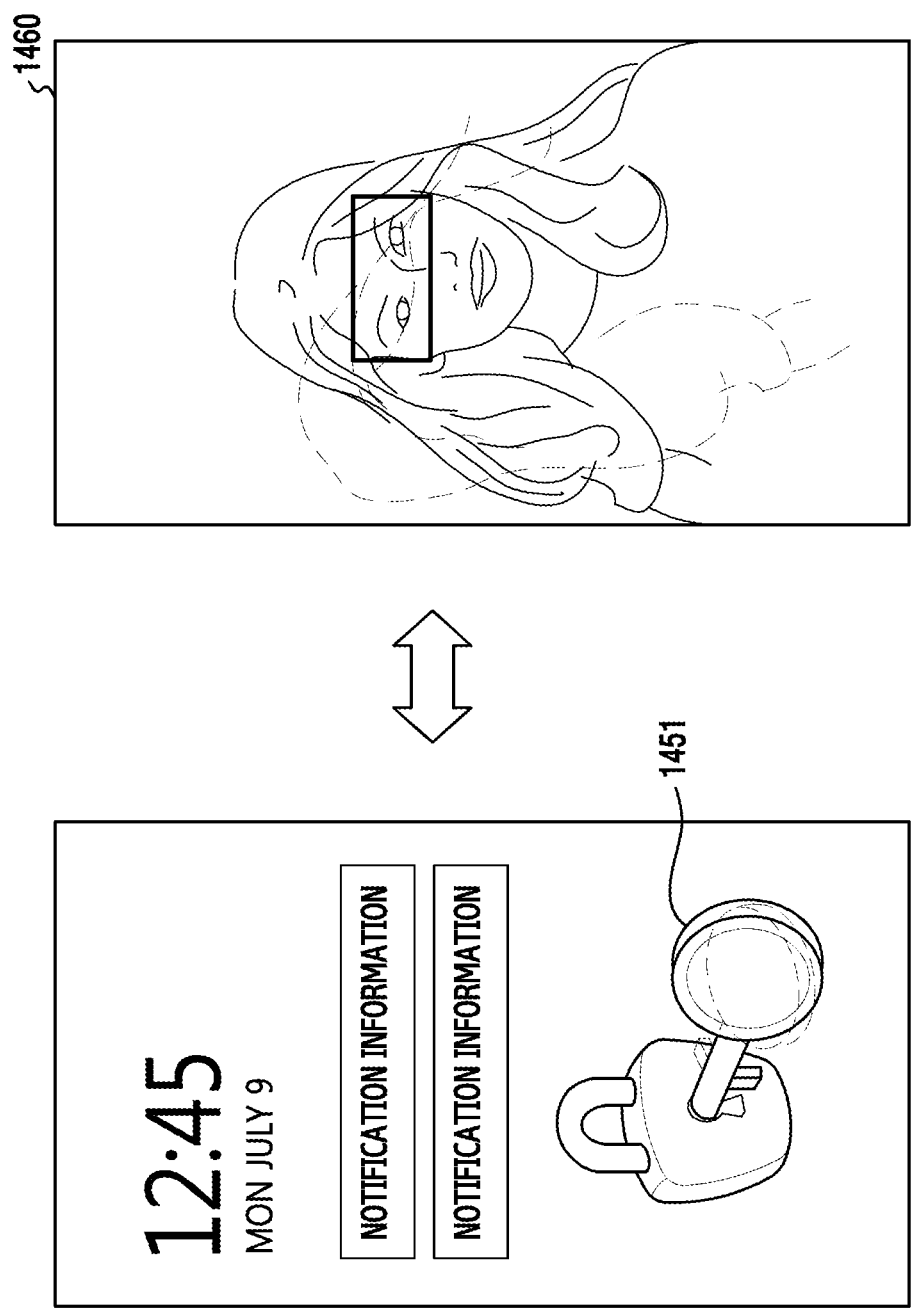

As another example, as illustrated in FIG. 14C, in a case in which a user input for notification information 1450 is detected in a state in which an angle of a captured image 1460 is rotated by a predetermined angle, as illustrated in FIG. 14D, the electronic device may restore the angle of the captured image 1460 into an original value. According to an embodiment, as illustrated in FIG. 14D, the electronic device may change an angle of a key image 1451 so that the angle of the key image 1451 correspond to the restored angle of the captured image 1460 and may display the key image 1451 while restoring the angle of the captured image 1460 into the original value.

At operation 1307, the electronic device determines whether the biometric information obtainment is possible. For example, the electronic device examines whether the biometric information obtainment is possible, using a predetermined reference area and the captured image received from the camera 180. For example, the electronic device examines whether the biometric information for the user authentication is present in an area of the captured image corresponding to the predetermined reference area. In a case in which the biometric information for the user authentication is present in the area of the captured image corresponding to the reference area, the electronic device may determine that the biometric information obtainment is possible, and in a case in which the biometric information for the user authentication is not present in the area of the captured image corresponding to the reference area, the electronic device may determine that the biometric information obtainment is impossible.

In a case in which the biometric information obtainment is impossible, at operation 1311, the electronic device may notify the authentication failure to a user. For example, in a case in which the biometric information obtainment is impossible, the electronic device may output, to the user, a message or a graphic image indicating the biometric information obtainment failure, and/or discrepancy between the reference area and the captured image. In a case in which the biometric information obtainment is possible, at operation 1309, the electronic device performs the user authentication using the biometric information and determines whether the user authentication is successful. For example, the electronic device may obtain the biometric information using the predetermined reference area and the captured image received from the camera 180, and may determine whether the user authentication is successful by comparing the obtained biometric information with previously stored biometric information.

At operation 1309, as a result of the determination whether the user authentication is successful, in a case in which it is determined that the user authentication fails, at operation 1311, the electronic device may notify the authentication fail to a user. For example, the electronic device may output a message or a graphic image indicating the failure of the user authentication due to discrepancy of the biometric information. At operation 1309, as a result of the determination whether the user authentication is successful, in a case in which it is determined that the user authentication is successful, the electronic device may perform an operation (e.g., a lock screen release and a payment function performance) corresponding to the user authentication success, and may end procedures according to an embodiment.

Figure 15:
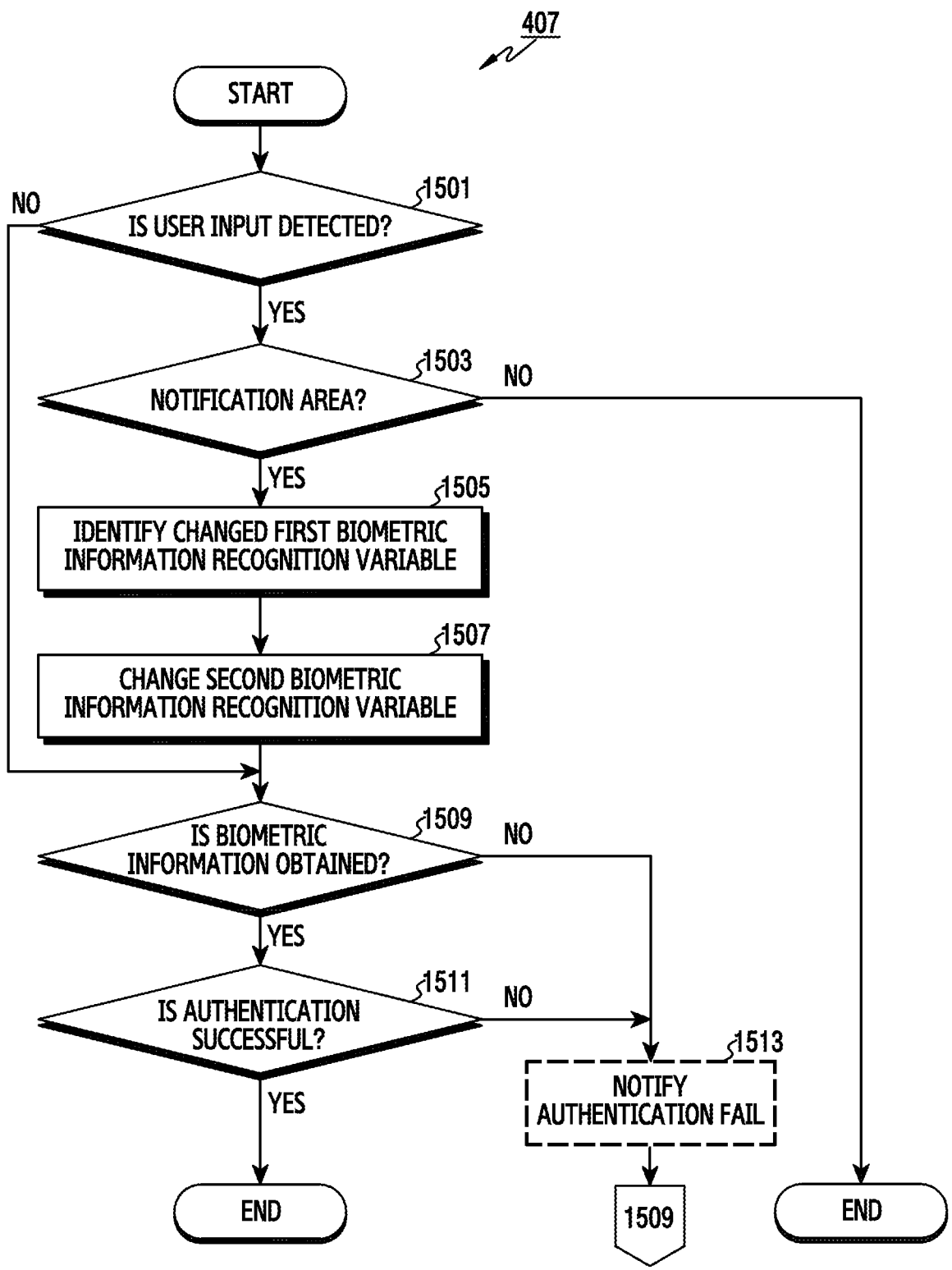
FIG. 15 illustrates a flowchart for performing the user authentication by sensing a touch for a notification area in the electronic device according to various embodiments of the disclosure.

FIG. 15 illustrates a flowchart for performing the user authentication by detecting a touch for a notification area in the electronic device according to various embodiments of the disclosure. FIGS. 16A, 16B, 16C, and 16D illustrate a screen configuration and a concept diagram for performing the user authentication by sensing the touch for the notification area in the electronic device according to various embodiments of the disclosure. Hereinafter, an operation of performing the user authentication by the electronic device at operation 407 of FIG. 4 is described in detail. In the following embodiment, each of operations may be sequentially performed, but is not limited thereto. For example, a sequence of each of the operations may be changed, and two or more operations may be performed in parallel. The electronic device may be the electronic device 101 of FIG. 1. An operation of a block shown as a dotted line in FIG. 15 may be omitted according to an embodiment.

Referring to FIG. 15, at operation 1501, the electronic device determines whether the user input is detected. For example, the electronic device may determine whether the user input (e.g., a touch input) is detected in a state in which the screen demanding the user authentication is displayed. The screen demanding the user authentication may include notification information related to a corresponding application. For example, the user authentication demand screen of the application providing the lock function may include information on a lock state, and notification information on an event (e.g., presence or not of an unchecked received message, presence or not of an unchecked call during one's absence, presence or not of an unchecked application notification, and the like) generated in the electronic device. As another example, the user authentication demand screen of the application providing the payment function may include information on a payment activation demand and information (e.g., payment card information, payment account information, and the like) on a payment method.

At operation 1503, the electronic device determines whether an area where the user input is detected is an area where the notification information is displayed. For example, the electronic device may determine whether the user input is an input for displaying the notification information in detail. In a case in which the area where the user input is detected is not the area where the notification information is displayed, the electronic device may end procedures according to various embodiments.

Figure 16A:
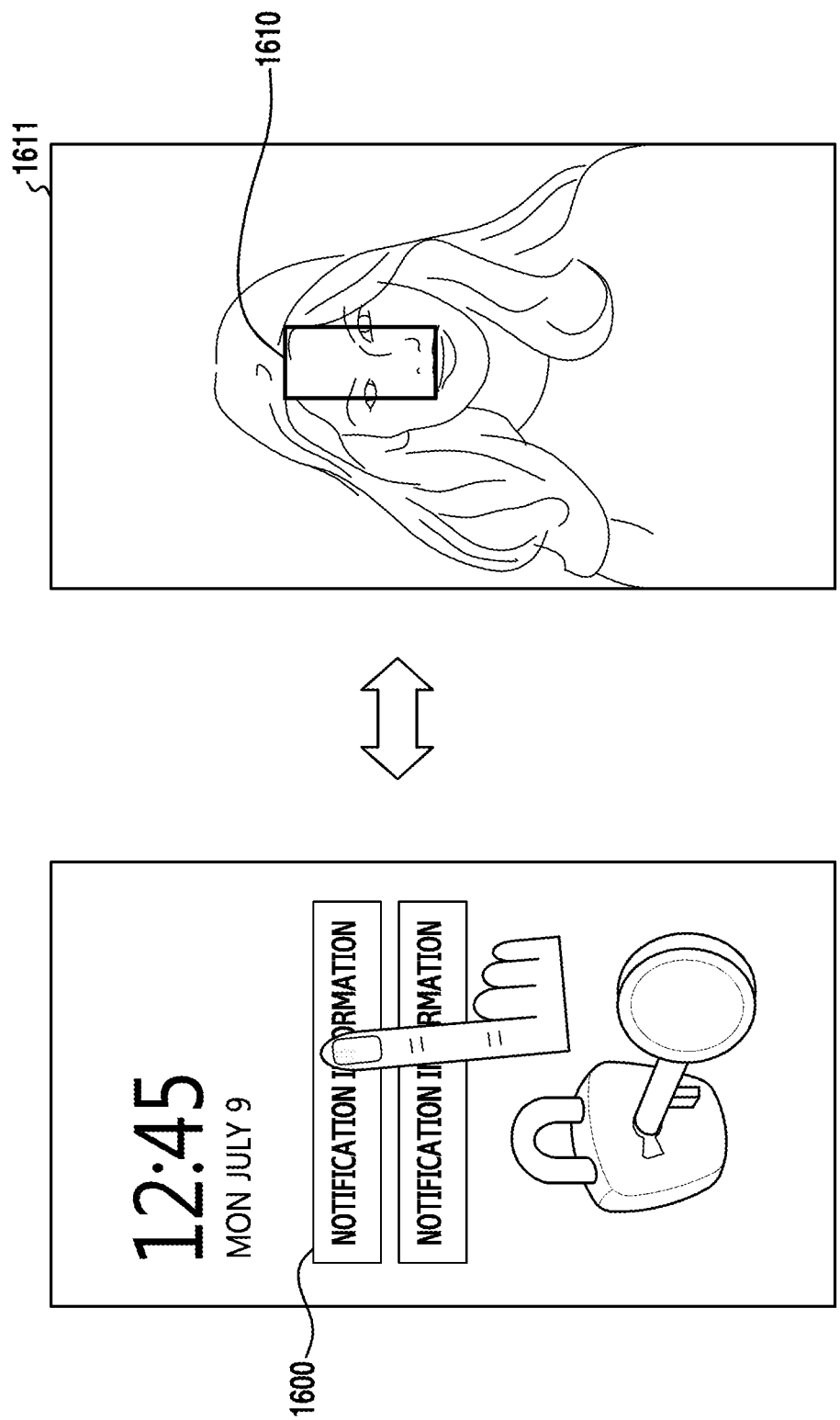
FIGS. 16A, 16B, 16C, and 16D illustrate a screen configuration and a concept diagram for performing the user authentication by sensing the touch for the notification area in the electronic device according to various embodiments of the disclosure.
Figure 16B:
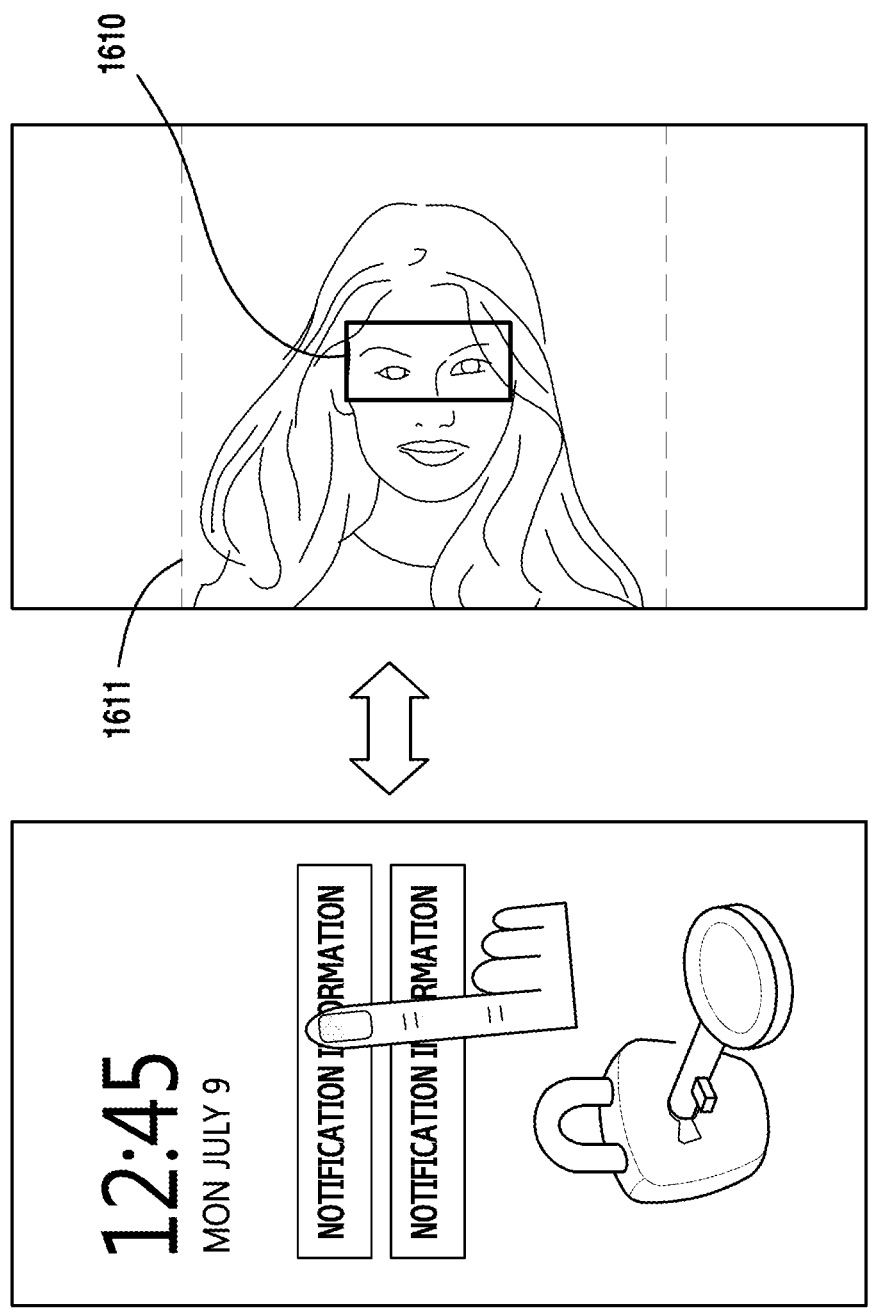
Figure 16C:
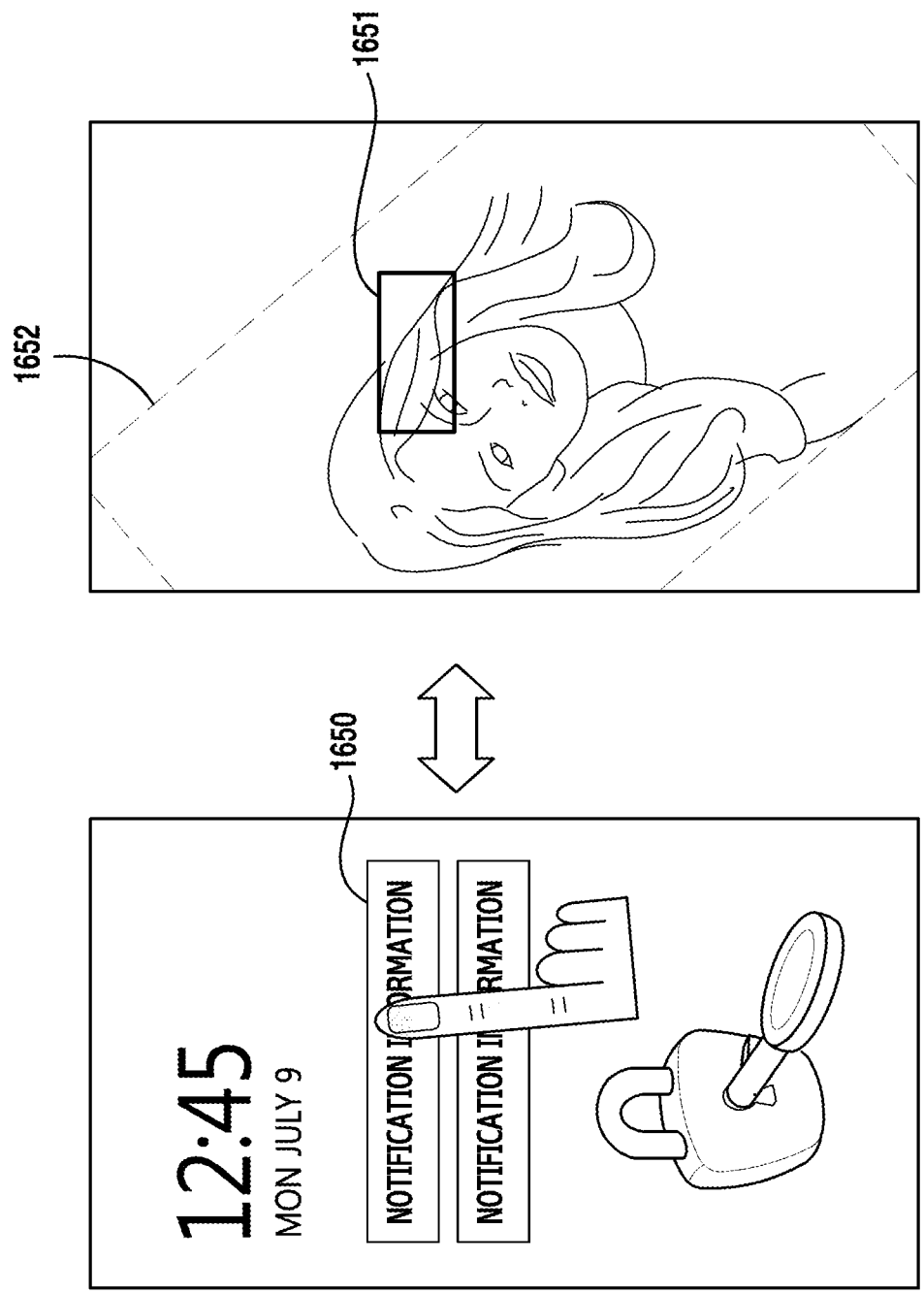

In a case in which the area where the user input is detected is the area where the notification information is displayed, at operation 1505, the electronic device identifies a first biometric information recognition variable which is previously changed. For example, in a case in which a user input for displaying the notification information in detail is detected, the electronic device may determine that the changed biometric information recognition variable is the first biometric information recognition variable, and may identify a value of the changed variable. For example, in a case in which the notification information is selected by a user, the electronic device may identify whether the biometric information recognition variable changed at operation 403 of FIG. 4 is the variable indicating the state of the reference area or the variable indicating the state of the captured image, and may identify a change value of a corresponding variable. Referring to FIG. 16A, a user input for an area where notification information 1600 is displayed, the electronic device may identify that an angle of a reference area 1610 is changed by a first angle and the variable of the captured image is not changed as a result of the operation at operation 403 of FIG. 4. As another example, as illustrated in FIG. 16C, in a case in which a user input for an area where notification information 1650 is displayed is detected, the electronic device may identify that a variable of a reference area 1651 is not changed and an angle of the captured image is changed by a second angle as a result of the operation at operation 403 of FIG. 4.

Figure 16D:
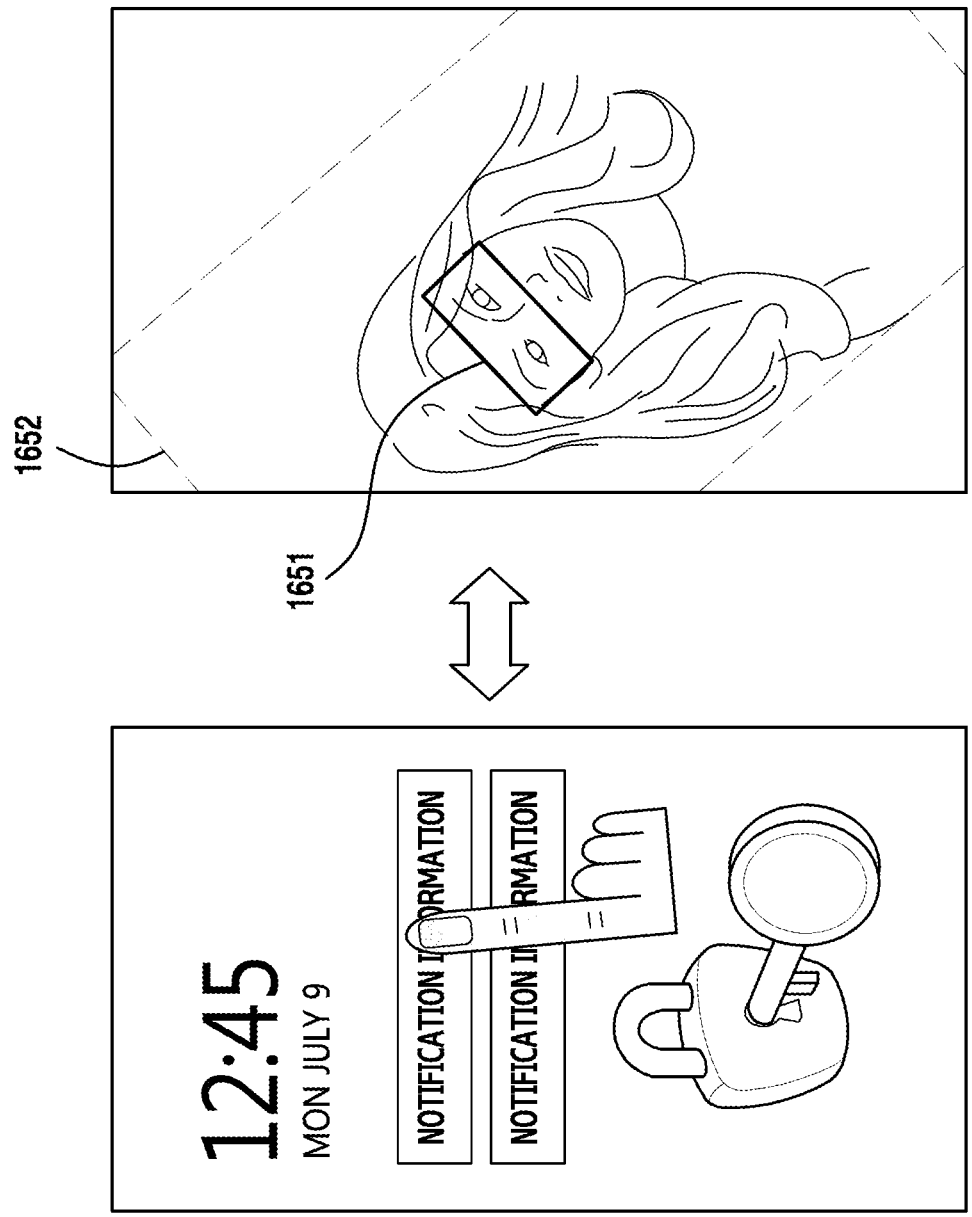

At operation 1507, the electronic device changes, based on the first biometric information recognition variable which is previously changed, a second biometric information recognition variable. For example, in a case in which the variable of the reference area is changed at operation 403 of FIG. 4, the electronic device may change, based on the changed variable of the reference area, the variable of the captured image. As another example, in a case in which the variable of the captured image is changed at operation 403 of FIG. 4, the electronic device may change, based on the changed variable of the captured image, the variable of the reference area. As a specific example, as illustrated in FIG. 16A, in a case in which an angle of a reference area 1610 is changed from a predetermined angle by a first angle, as illustrated in FIG. 16B, the electronic device may change an angle of a captured image 1611 from a predetermined angle by the first angle. As another example, as illustrated in FIG. 16C, in a case in which an angle of a captured image 1652 is changed from a predetermined angle by a second angle, as illustrated in FIG. 16D, the electronic device may change an angle of the reference area 1651 from a predetermined angle by the second angle.

At operation 1509, the electronic device determines whether the biometric information obtainment is possible. For example, the electronic device examines whether the biometric information obtainment is possible, using a changed reference area and a changed captured image. For example, the electronic device examines whether the biometric information for the user authentication is present in an area corresponding to the changed reference area within the area of the changed captured image. In a case in which the biometric information for the user authentication is present, the electronic device may determine that the biometric information obtainment is possible, and in a case in which the biometric information for the user authentication is not present, the electronic device may determine that the biometric information obtainment is impossible.

In a case in which the biometric information obtainment is impossible, at operation 1513, the electronic device may notify the authentication failure to a user. For example, in a case in which the biometric information obtainment is impossible, the electronic device may output, to the user, a message or a graphic image indicating the biometric information obtainment failure, and/or discrepancy between the reference area and the captured image. In a case in which the biometric information obtainment is possible, at operation 1511, the electronic device performs the user authentication using the biometric information and determines whether the user authentication is successful. For example, the electronic device may obtain the biometric information using the changed reference area and the changed captured image, and may determine whether the user authentication is successful by comparing the obtained biometric information with previously stored biometric information.

At operation 1511, as a result of the determination whether the user authentication is successful, in a case in which it is determined that the user authentication fails, at operation 1513, the electronic device may notify the authentication fail to a user. For example, the electronic device may output a message or a graphic image indicating the failure of the user authentication due to discrepancy of the biometric information. At operation 1511, as a result of the determination whether the user authentication is successful, in a case in which it is determined that the user authentication is successful, the electronic device may perform an operation (e.g., a lock screen release and a payment function performance) corresponding to the user authentication success, and may end procedures according to an embodiment.

Figure 17:
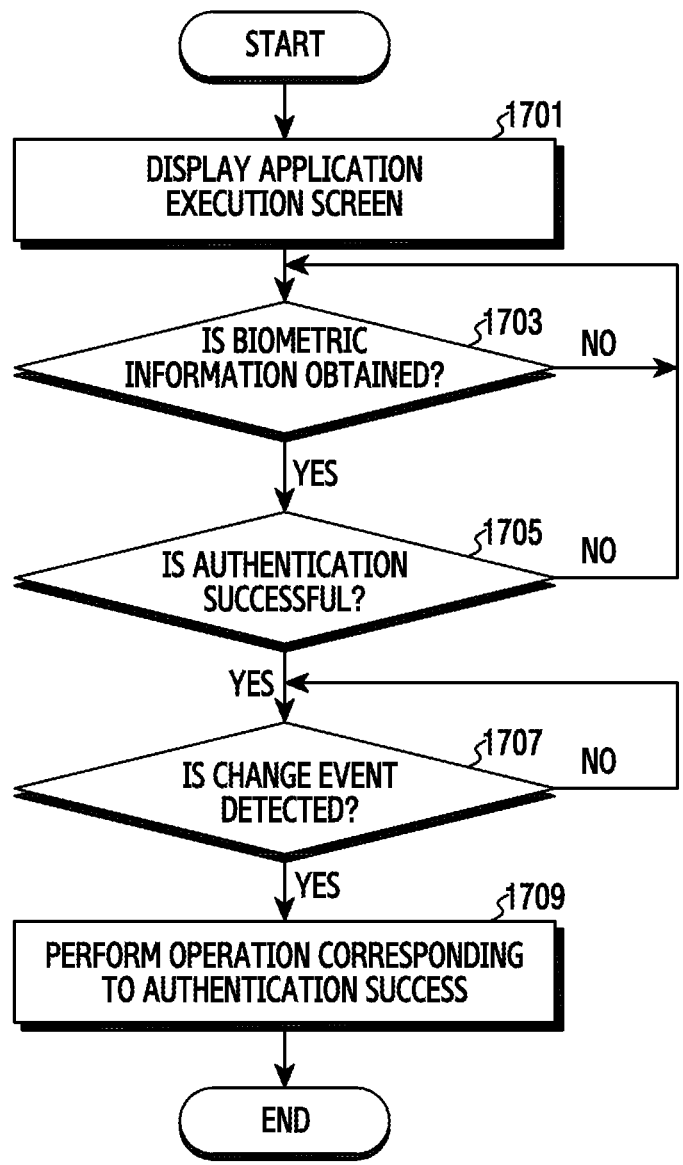
FIG. 17 illustrates a flowchart for performing the user authentication in the electronic device according to various embodiments of the disclosure.

FIG. 17 illustrates a flowchart for performing the user authentication in the electronic device according to various embodiments of the disclosure. In the following embodiment, each of operations may be sequentially performed, but is not limited thereto. For example, a sequence of each of the operations may be changed, and two or more operations may be performed in parallel. The electronic device may be the electronic device 101 of FIG. 1.

Referring to FIG. 17, at operation 1701, the electronic device displays, based on the user input, the application execution screen. According to various embodiments, the application execution screen may include a screen (e.g., a screen displaying a lock state, a biometric information input demand screen, a password input demand screen, a pattern input demand screen, a payment activation demand screen, and the like) demanding the user authentication. For example, the electronic device may detect, based on the user input, the demand of the execution of the application providing the lock function, and may display the screen displaying the lock state. For example, in a case in which an input of a specific button is detected in a state in which an always on display (AOD) function is executed, the electronic device may display a lock screen displaying the lock state of the electronic device by executing the application providing the lock function. As another example, the electronic device may detect, based on the user input, the demand of the execution of the application providing the payment function, and may display the payment activation demand screen. According to various embodiments, the screen demanding the user authentication may include the notification information related to a corresponding application. For example, the user authentication demand screen of the application providing the lock function may include information on a lock state and notification information on an event (e.g., presence or not of an unchecked received message, presence or not of an unchecked call during one's absence, presence or not of an unchecked application notification, and the like) generated in the electronic device. As another example, the user authentication demand screen of the application providing the payment function may include information on a payment activation demand and information (e.g., payment card information, payment account information, and the like) on a payment method.

At operation 1703, the electronic device determines whether the biometric information obtainment is possible. For example, the electronic device examines whether the biometric information obtainment is possible, using a predetermined reference area and the captured image received from the camera 180. For example, the electronic device examines whether the biometric information for the user authentication is present in an area corresponding to the predetermined reference area within the area of the captured image. In a case in which the biometric information for the user authentication is present, the electronic device may determine that the biometric information obtainment is possible, and in a case in which the biometric information for the user authentication is not present, the electronic device may determine that the biometric information obtainment is impossible. In a case in which the biometric information obtainment is impossible, the electronic device may repeatedly perform at operation 1703. According to an embodiment, the electronic device may repeatedly perform at operation 1703 in a predetermined period, or may repeatedly perform at operation 1703 whenever a user gesture or a movement of the electronic device is detected.

In a case in which the biometric information obtainment is possible, at operation 1705, the electronic device performs the user authentication using the biometric information and determines whether the user authentication is successful. For example, the electronic device may obtain the biometric information using the predetermined reference area and the captured image from the camera 180, and may determine whether the user authentication is successful by comparing the obtained biometric information with previously stored biometric information. In a case in which it is determined that the user authentication fails failed, the electronic device may return to at operation 1703. According to another embodiment, in a case in which it is determined that the user authentication fails failed, the electronic device may notify the authentication failure to a user. For example, the electronic device may output a message or a graphic image indicating the failure of the user authentication due to discrepancy of the biometric information.

In a case in which it is determined that the user authentication is successful, at operation 1707, the electronic device may detect whether a change event for performing an operation corresponding to the user authentication success is generated. The change event may include a predetermined user gesture. For example, the change event may be an event generated by a user gesture, such as a face rotation of a user, a rotation of the electronic device, a face position movement of a user, a position movement of the electronic device, and a distance change between a user and the electronic device. According to an embodiment, in a case in which it is determined that the user authentication is successful, the electronic device may end the driving of the camera, and may drive one or more other sensors for detecting the user gesture. According to another embodiment, in a case in which it is determined that the user authentication is successful, the electronic device may maintain the driving of the camera, and may detect the user gesture using the camera.

In a case in which the change event is detected, at operation 1709, the electronic device may perform an operation (e.g., a lock screen release and a payment function performance) corresponding to the user authentication success, and may end procedures according to an embodiment.

According to various embodiments, a method of operating an electronic device may comprise detecting an execution of an application which provides an authentication service based on biometric information, changing at least one biometric information recognition related variable, in response to detecting the execution of the application, and displaying an application execution screen comprising at least one authentication guide image corresponding to the at least one biometric information recognition related variable.

According to various embodiments, the method of operating the electronic device may further comprise obtaining a captured image including the biometric information, and the at least one biometric information recognition related variable may comprise at least one of a variable indicating a state of a reference area which is set for recognizing the biometric information from the captured image, and a variable indicating a state of the captured image.

According to various embodiments, the at least one biometric information recognition related variable may comprise at least one of a position of the reference area, an angle of the reference area, a size of the reference area, a position of the captured image, an angle of the captured image, and a size of the captured image.

According to various embodiments, the at least one authentication guide image may comprise at least one of a first authentication guide image corresponding to the reference area, and a second authentication guide image corresponding to the captured image.

According to various embodiments, the displaying the application execution screen may comprise controlling, based on a value obtained by a change of the at least one biometric information recognition related variable, a display of the at least one authentication guide image.

According to various embodiments, the changing the at least one biometric information recognition related variable may comprise changing the at least one biometric information recognition related variable from a predetermined first value to a second value, in response to detecting the execution of the application, and the second value may be a random value or a value determined according to a predetermined regulation.

According to various embodiments, the method of operating the electronic device may further comprise detecting a user input for the at least one authentication guide image, updating, based on the user input, a display of the at least one authentication guide image, and updating, based on the user input, the at least one biometric information recognition related variable.

According to various embodiments, the method of operating the electronic device may further comprise detecting a user input for at least one piece of notification information included in the application execution screen, and restoring the at least one biometric information recognition related variable into an original value, in response to the user input.

According to various embodiments, the method of operating the electronic device may further comprise performing, based on the at least one biometric information recognition related variable, a user authentication.

As described above, according to various embodiments, in the electronic device, the user authentication can be performed without a user input in a state in which the execution screen of the application providing the authentication service based on the biometric information. In addition, in the electronic device, the performance of the user authentication can be prevented at the time point when a user does not intend to perform the user authentication, by changing the variables related to the biometric recognition.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate arrays (FPGA), and a programmable-logic device for performing operations which has been known or are to be developed hereinafter.

According to various embodiments, at least some of the devices (for example, modules or functions thereof) or the method (for example, operations) according to the disclosure may be implemented by a command stored in a computer-readable storage medium in a program module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (for example, a magnetic tape), optical media (for example, a compact disc read only memory (CD-ROM) and a DVD), magneto-optical media (for example, a floptical disk), a hardware device (for example, a read only memory (ROM), a random access memory (RAM), a flash memory), and the like. In addition, the program instructions may include high class language codes, which can be executed in a computer by using an interpreter, as well as machine codes made by a compiler. Any of the hardware devices as described above may be configured to work as one or more software modules in order to perform the operations according to various embodiments of the disclosure, and vice versa.

Any of the modules or programming modules according to various embodiments of the disclosure may include at least one of the above described elements, exclude some of the elements, or further include other additional elements. The operations performed by the modules, programming module, or other elements according to various embodiments of the disclosure may be executed in a sequential, parallel, repetitive, or heuristic manner. Further, some operations may be executed according to another order or may be omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a display;
at least one processor; and
at least one memory storing one or more computer programs including instructions configured to be executed by the at least one processor to cause the at least one processor to at least:
  detect an event for executing an application which provides an authentication service,
  based on the detecting of the event, change at least one biometric information recognition related variable comprising at least one variable indicating a state of a captured image obtained through a camera of the electronic device,
  match the captured image to an authentication guide image,
  control the display to display an application execution screen including at least one authentication guide image comprising a changed authentication guide image changed from the authentication guide image based on the changed at least one biometric information recognition related variable, and
  perform user authentication based on the at least one biometric information recognition related variable,
wherein the at least one biometric information recognition related variable further comprises a variable indicating a state of a reference area set for recognizing biometric information from the captured image, and
wherein the at least one authentication guide image further includes another changed guide image changed from another guide image based on the variable indicating the state of the reference area.

2. The electronic device of claim 1, wherein the at least one biometric information recognition related variable further comprises at least one of a position of the reference area, an angle of the reference area, a size of the reference area, a position of the captured image, an angle of the captured image, or a size of the captured image.

3. The electronic device of claim 1, wherein the at least one authentication guide image includes at least one of a first authentication guide image corresponding to the reference area, or a second authentication guide image corresponding to the captured image.

4. The electronic device of claim 1, wherein the instructions, when executed by the at least one processor, further causes the at least one processor to at least, based on a value obtained by a change of the at least one biometric information recognition related variable, control a displaying of the at least one authentication guide image.

5. The electronic device of claim 1,
wherein the instructions, when executed by the at least one processor, further causes the at least one processor to at least, in response to detecting the event, change the at least one biometric information recognition related variable from a predetermined first value to a second value, and
wherein the second value is a random value or a value determined according to a predetermined regulation.

6. The electronic device of claim 1,
wherein the display comprises a touch sense display configured to detect user inputs, and
wherein the instructions, when executed by the at least one processor, further causes the at least one processor to at least:
detect a user input regarding the at least one authentication guide image, and
based on the user input, update the displaying of the at least one authentication guide image and update the at least one biometric information recognition related variable.

7. The electronic device of claim 1,
wherein the display includes a touch sense display configured to detect user inputs,
wherein the application execution screen includes at least one piece of notification information related to the application, and
wherein the instructions, when executed by the at least one processor, further causes the at least one processor to at least:
detect a user input regarding notification information among the at least one piece of notification information, and
in response to detecting the user input, restore the at least one biometric information recognition related variable into an original value.

8. The electronic device of claim 1, wherein the changing of the at least one biometric information recognition related variable is performed prior to attempting to obtain biometric information thereby preventing the at least one processor from obtaining the biometric information in a situation in which a user does not intend to perform user authentication.

9. A method of operating an electronic device, the method comprising:
detecting an event for executing an application which provides an authentication service;
obtaining a captured image including biometric information;
based on the detecting of the event, changing at least one biometric information recognition related variable comprising at least one variable indicating a state of the captured image obtained through a camera of the electronic device;
matching the captured image to an authentication guide image;
displaying an application execution screen including at least one authentication guide image comprising a changed authentication guide image changed from the authentication guide image based on the changed at least one biometric information recognition related variable; and
performing user authentication of a user based on the at least one biometric information recognition related variable,
wherein the at least one biometric information recognition related variable further comprises a variable indicating a state of a reference area which is set for recognizing the biometric information from the captured image, and
wherein the at least one authentication guide image further includes another changed guide image changed from another guide image based on the variable indicating the state of the reference area.

10. The method of claim 9, wherein the at least one biometric information recognition related variable further comprises at least one of a position of the reference area, an angle of the reference area, a size of the reference area, a position of the captured image, an angle of the captured image, or a size of the captured image.

11. The method of claim 9, wherein the at least one authentication guide image includes at least one of a first authentication guide image corresponding to the reference area, or a second authentication guide image corresponding to the captured image.

12. The method of claim 9, further comprising, based on a value obtained by a change of the at least one biometric information recognition related variable, controlling the displaying of the at least one authentication guide image.

13. The method of claim 9,
wherein the changing the at least one biometric information recognition related variable comprises changing the at least one biometric information recognition related variable from a predetermined first value to a second value, in response to detecting the event, and
wherein the second value is a random value or a value determined according to a predetermined regulation.

14. The method of claim 9, further comprising:
detecting a user input regarding the at least one authentication guide image; and
based on the user input, updating a display of the at least one authentication guide image and updating the at least one biometric information recognition related variable.

15. The method of claim 9, further comprising:
detecting a user input regarding at least one piece of notification information included in the application execution screen; and
in response to detecting the user input, restoring the at least one biometric information recognition related variable into an original value.

* * * * *